United States Patent
Kawamoto et al.

(10) Patent No.: US 9,836,116 B2
(45) Date of Patent: Dec. 5, 2017

(54) INFORMATION PROCESSING APPARATUS AND INFORMATION PROCESSING METHOD THAT TRANSITIONS BETWEEN MULTIPLE POSTURES FOR CONTROLLING A DISPLAY STATE

(71) Applicant: Sony Corporation, Minato-ku (JP)

(72) Inventors: Daisuke Kawamoto, Nagano (JP); Toshiyuki Shiwa, Nagano (JP); Masami Hosaka, Nagano (JP); Shunichiro Takamura, Nagano (JP); Kenichi Ono, Nagano (JP); Takehiko Mizutani, Nagano (JP); Toshihiro Kawakubo, Nagano (JP); Nobuhiro Kumae, Nagano (JP); Tailiang Qian, Shanghai (CN); Naoki Ogishita, Tokyo (JP); Minoru Shimizu, Kanagawa (JP); Yuuki Kubota, Tokyo (JP); Takuya Motoishi, Tokyo (JP); Takashi Sonehara, Nagano (JP); Ryousuke Tobiyama, Nagano (JP)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 14/183,930

(22) Filed: Feb. 19, 2014

(65) Prior Publication Data
US 2014/0292646 A1 Oct. 2, 2014

(30) Foreign Application Priority Data

Mar. 26, 2013 (JP) .................................. 2013-064122
Aug. 12, 2013 (JP) .................................. 2013-167752

(51) Int. Cl.
*G06F 3/01* (2006.01)
*G06F 1/16* (2006.01)

(52) U.S. Cl.
CPC ................ *G06F 3/01* (2013.01); *G06F 1/162* (2013.01); *G06F 1/1643* (2013.01); *G06F 1/1677* (2013.01); *G06F 2200/1614* (2013.01)

(58) Field of Classification Search
CPC .......... G06F 1/16; G06F 1/1613–1/162; G06F 1/1633; G06F 1/1637; G06F 1/1643;
(Continued)

(56) References Cited

U.S. PATENT DOCUMENTS

| 5,432,676 | A | 7/1995 | Satoh et al. |
| 5,489,924 | A | 2/1996 | Shima et al. |

(Continued)

FOREIGN PATENT DOCUMENTS

| CN | 101276237 A | 10/2008 |
| CN | 102037425 A | 4/2011 |

(Continued)

OTHER PUBLICATIONS

English translation fo JP 20120082929 A.*
(Continued)

*Primary Examiner* — Nathan Danielsen
(74) *Attorney, Agent, or Firm* — Oblon, McClelland, Maier & Neustadt, L.L.P.

(57) ABSTRACT

According to the present disclosure, there is provided an information processing apparatus, including a first housing, a second housing, having a display section which displays information, in which the display section is reversed between a first position and a second position, a connection section which rotatably connects the second housing with respect to the first housing, a posture detection section which detects any of the four postures of a first posture, a second posture, a third posture, and a fourth posture, and a display (Continued)

control section which controls a display state of the display section in accordance with a detection result of the posture detection section.

13 Claims, 39 Drawing Sheets

(58) Field of Classification Search
CPC ........ G06F 1/1675; G06F 1/1677; G06F 3/01; G06F 3/041; G06F 3/0412; G06F 3/044–3/047
See application file for complete search history.

(56) References Cited

U.S. PATENT DOCUMENTS

| | | | |
|---|---|---|---|
| 5,541,813 A | 7/1996 | Satoh et al. | |
| 7,164,432 B1* | 1/2007 | Amemiya | G06F 1/1616 345/649 |
| 2003/0112590 A1* | 6/2003 | Shimano | G06F 1/162 361/679.06 |
| 2004/0160735 A1 | 8/2004 | Ghosh et al. | |
| 2005/0052834 A1 | 3/2005 | Tanaka et al. | |
| 2005/0105263 A1* | 5/2005 | Tanaka | G06F 1/162 361/679.06 |
| 2008/0238816 A1 | 10/2008 | Matsushita | |
| 2008/0271288 A1 | 11/2008 | Senatori | |
| 2009/0244012 A1* | 10/2009 | Behar | G06F 1/162 345/169 |
| 2015/0047446 A1* | 2/2015 | Lai | G06F 1/1681 74/96 |
| 2016/0252930 A1* | 9/2016 | Senatori | G06F 1/1616 |

FOREIGN PATENT DOCUMENTS

| | | |
|---|---|---|
| EP | 1 513 047 A2 | 3/2005 |
| EP | 1 975 762 A1 | 10/2008 |
| JP | 5-165547 | 7/1993 |
| JP | 5-71954 | 9/1993 |
| JP | 11-284700 | 10/1999 |
| JP | 2008-21171 | 1/2008 |
| JP | 2008-294375 | 12/2008 |
| JP | 2011-516974 | 5/2011 |
| JP | 2011-118453 | 6/2011 |
| JP | 2011-119795 | 6/2011 |
| JP | 2011-182338 | 9/2011 |
| JP | 2012-8929 A | 1/2012 |
| JP | 2012-8932 | 1/2012 |
| JP | 2012008929 A * | 1/2012 |
| JP | 2013-17661 | 1/2013 |

OTHER PUBLICATIONS

The Extended European Search Report dated Oct. 17, 2014, in Application No. / Patent No. 14152467.8-1959 / 2784624.
The Extended European Search Report dated Oct. 20, 2014, in Application No. / Patent No. 14152498.3-1959 / 2784625.
Chinese Office Action issued in Application No. 201410100429.8 dated Oct. 27, 2016 (w/ English translation).
Japanese Office Action issued in Application No. 2013-167751 dated Dec. 13, 2016 (w/ English Translation).
Japanese Office Action issued in Application No. 2013-167752 dated Jan. 31, 2017.
European Office Action dated Feb. 23, 2017 in Patent Application No. 14 152 467.8.
Combined Office Action and Search Report dated Mar. 20, 2017 in Chinese Patent Application No. 201410100070.4 (with English Translation).
Chinese Office Action issued in Chinese Patent Application No. 201410100429.8 dated Jun. 8, 2017 (w/ English translation).

* cited by examiner

FIG. 27
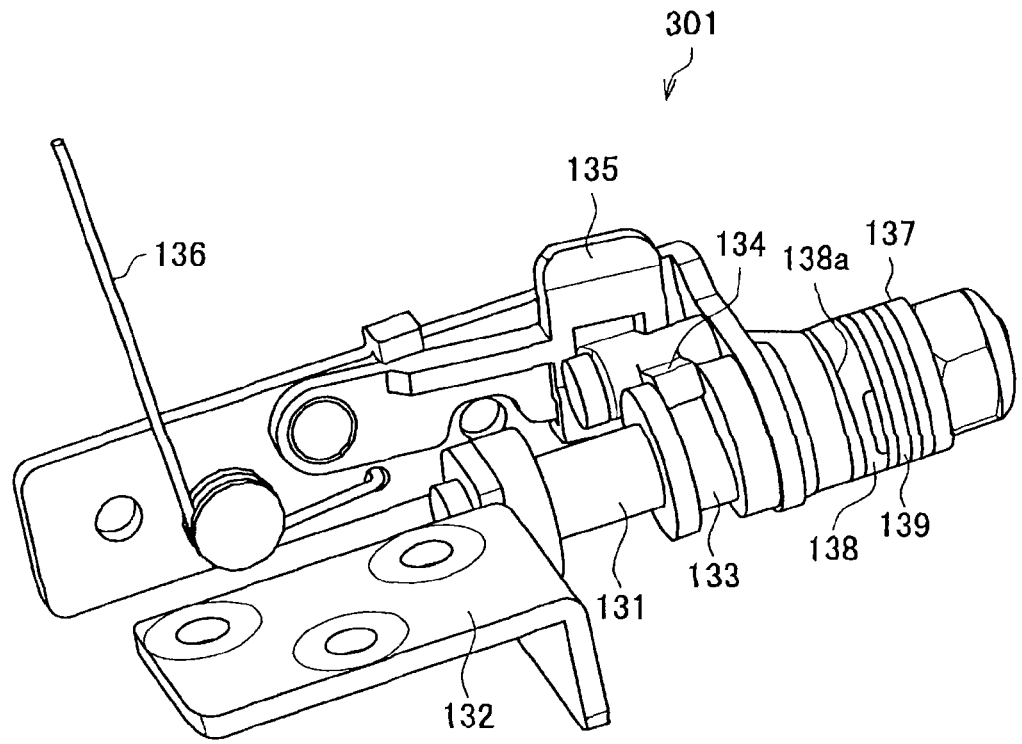
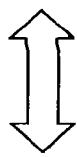
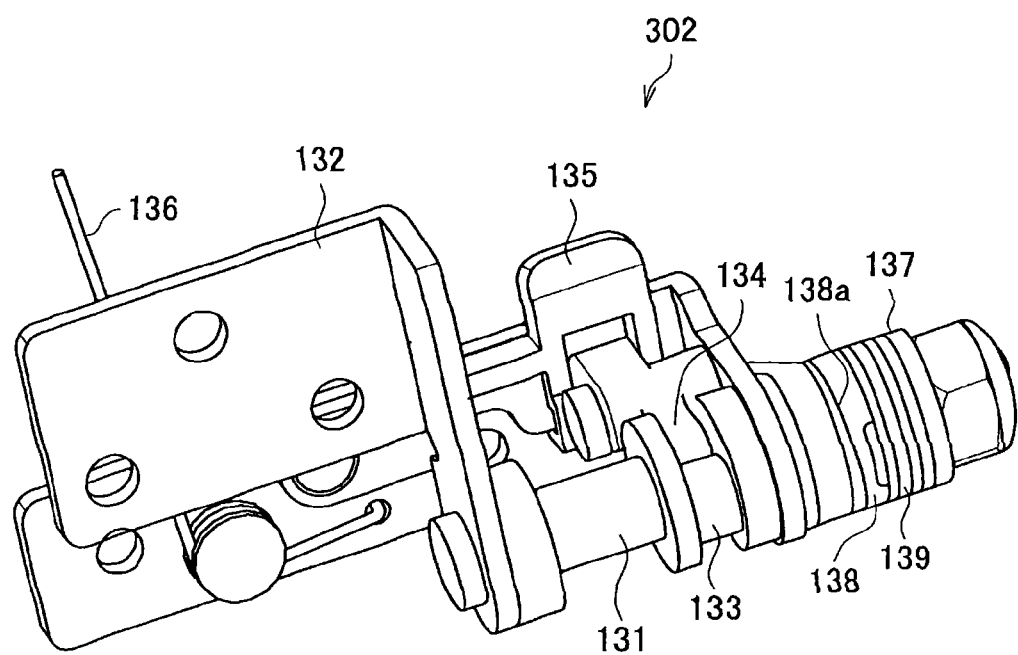

T1

| POSTURE | FIRST DETECTION SENSOR 261 | SECOND DETECTION SENSOR 262 | THIRD DETECTION SENSOR 263 |
|---|---|---|---|
| FIRST POSTURE P1 | ON | ON | (OFF) |
| SECOND POSTURE P2 | ON | OFF | (OFF) |
| THIRD POSTURE P3 | OFF | OFF | ON |
| FOURTH POSTURE P4 | OFF | ON | ON |
| FIFTH POSTURE P5 | OFF | OFF | OFF |

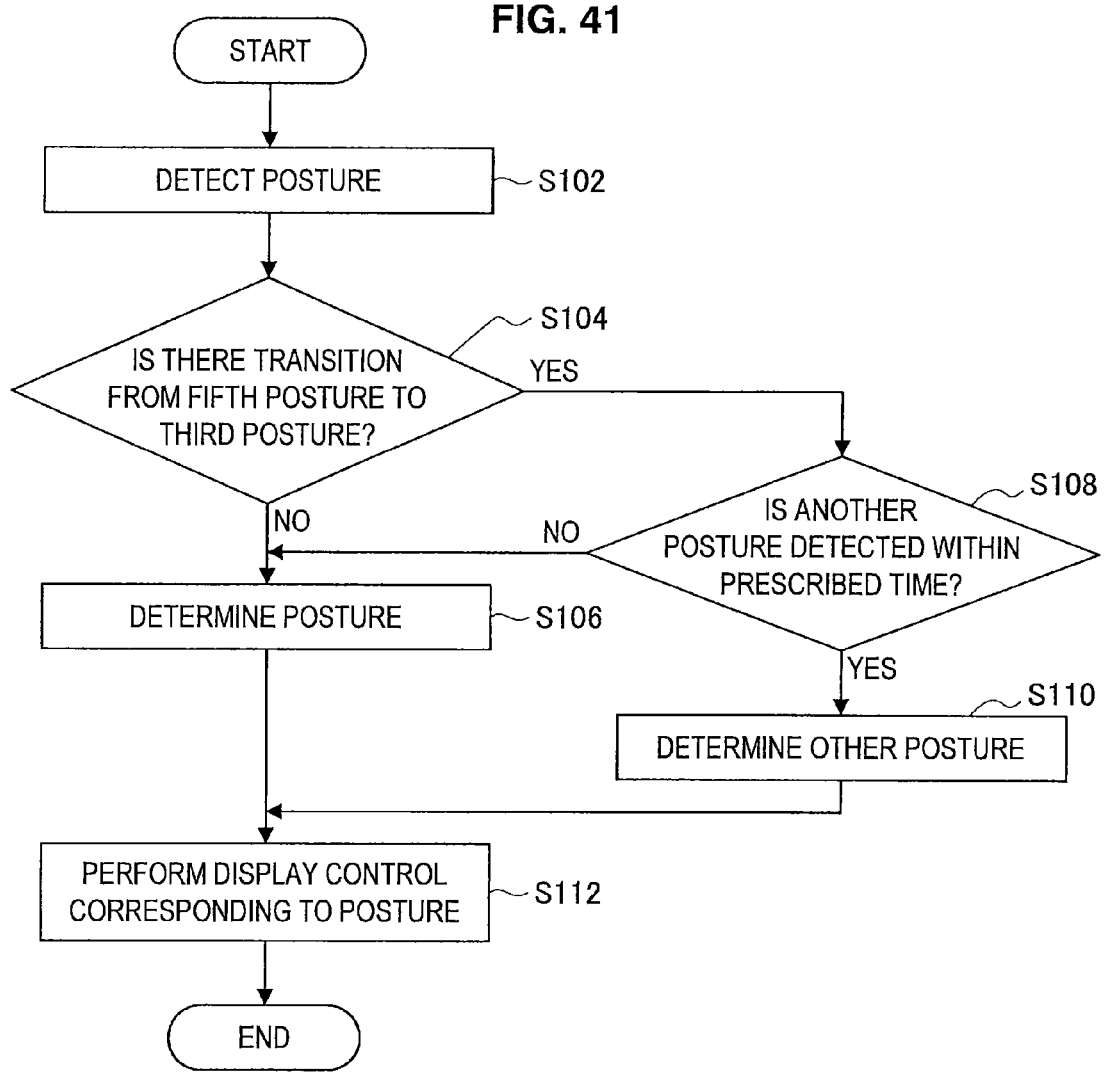

INFORMATION PROCESSING APPARATUS AND INFORMATION PROCESSING METHOD THAT TRANSITIONS BETWEEN MULTIPLE POSTURES FOR CONTROLLING A DISPLAY STATE

CROSS REFERENCE TO RELATED APPLICATIONS

This application claims the benefit of Japanese Priority Patent Application JP 2013-064122 filed Mar. 26, 2013, and Japanese Priority Patent Application JP 2013-167752 filed Aug. 12, 2013, the entire contents of each of which are incorporated herein by reference.

BACKGROUND

The present disclosure relates to an information processing apparatus and an information processing method.

Foldable notebook personal computers, such as electronic apparatuses, have become prevalent as information processing apparatuses. In such electronic apparatuses, connection sections which are hinges rotatably connect a second housing having a display section with respect to a first housing having an operation section.

JP 2011-48536A discloses an electronic apparatus in which a display section is rotated to be capable of opening and closing with respect to a main body section via connection sections. Further, the display section of JP 2011-48536A has a touch panel. Also, when the display section is open, a user operates operation keys included on the main body section while viewing the display section, and when the display section is closed, the user performs touch operations while viewing the display section (a so-called tablet).

SUMMARY

In recent years, the utilization modes of electronic apparatuses have diversified, and implementation of a configuration in which a second housing having a display section is allowed to transition to a plurality of rotation states (postures) with respect to a first housing, so that various operations by a user become possible, has been in demand. Accordingly, a configuration has been considered in which a second housing having a display section transitions between four postures with respect to a first housing.

Since in the case where the second housing transitions between four postures, the use cases will be different in accordance with the posture, there will be cases where the display form of the display section desired by a user differs in accordance with the posture of the second housing. However, control of the display state of the display section when the second housing transitions between four postures has not been sufficiently considered.

Accordingly, the present disclosure proposes a method, when a housing having a display section transitions between four postures, which appropriately controls a display state of the display section in accordance with the posture.

According to the present disclosure, there is provided an information processing apparatus, including a first housing, a second housing, having a display section which displays information, in which the display section is reversed between a first position and a second position, a connection section which rotatably connects the second housing with respect to the first housing, a posture detection section which detects any of the four postures of a first posture in which the second housing is closed with respect to the first housing so that the display section positioned in the first position faces a main surface of the first housing, a second posture in which the second housing is opened with respect to the first housing in a state in which the display section is positioned in the first position, a third posture in which the second housing is opened with respect to the first housing in a state in which the display section is positioned in the second position, and a fourth posture in which the second housing is closed with respect to the first housing so that a portion of an opposite side of the display section positioned in the second position faces the main surface of the first housing, and a display control section which controls a display state of the display section in accordance with a detection result of the posture detection section.

According to the present disclosure such as described above, it becomes possible, when a housing having a display section transitions between four postures, to appropriately control a display state of the display section in accordance with the posture.

Note that, the above described effect is not necessarily limited, and any of the effects to be shown in the present disclosure, or other effects which can be understood from the present disclosure, may be accomplished along with the above described effect or instead of the above described effect.

BRIEF DESCRIPTION OF THE DRAWINGS

FIG. 27 is a figure for describing an operation example of the hinge mechanism section 130;

FIG. 41 is a flow chart which shows a process example of display control corresponding to the posture detection of the electronic apparatus 200.

DETAILED DESCRIPTION OF THE EMBODIMENT(S)

Figure 1:
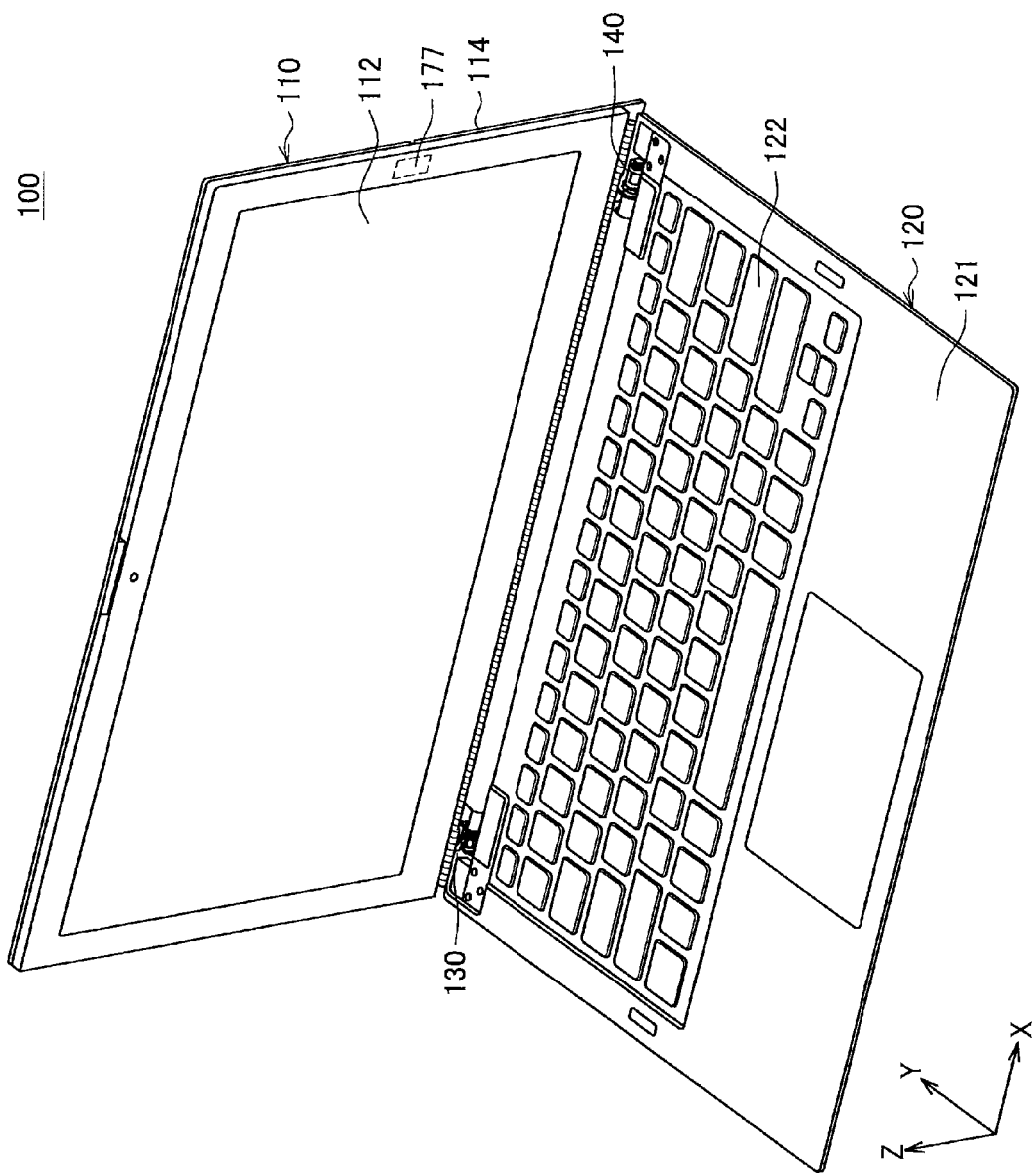
FIG. 1 is a perspective view which shows an opened state of an electronic apparatus 100 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. The first embodiment
  1-1. Schematic configuration of the electronic apparatus
  1-2. Connection bending section and peripheral configuration
  1-3. Detailed configuration of the hinge mechanism sections
  1-4. Rotation operation of the electronic apparatus between the closed state and the reversed state
  1-5. Conclusion
2. The second embodiment
  2-1. External appearance configuration of the information processing apparatus
  2-2. Functional configuration of the information processing apparatus
  2-3. Operation example
  2-4. Rotation control of the screen of the display section
  2-5. Conclusion

1. The First Embodiment (1-1. Configuration of the Electronic Apparatus)

An example of the configuration of an electronic apparatus 100 according to an embodiment of the present disclosure will be described with reference to FIG. 1 to FIG. 14.

Figure 2:
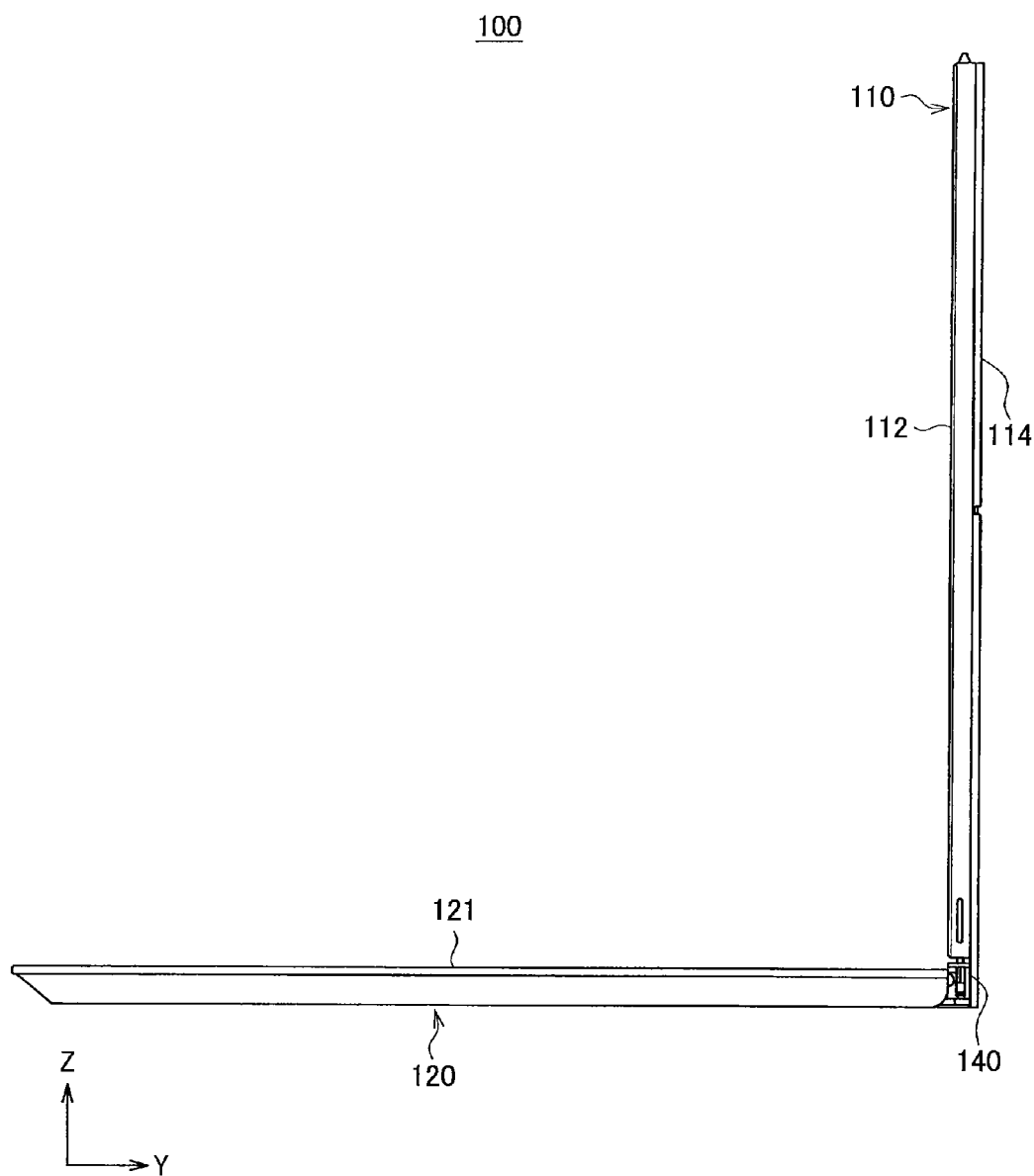
FIG. 2 is a side view of the electronic apparatus 100 shown in FIG. 1.
Figure 3:
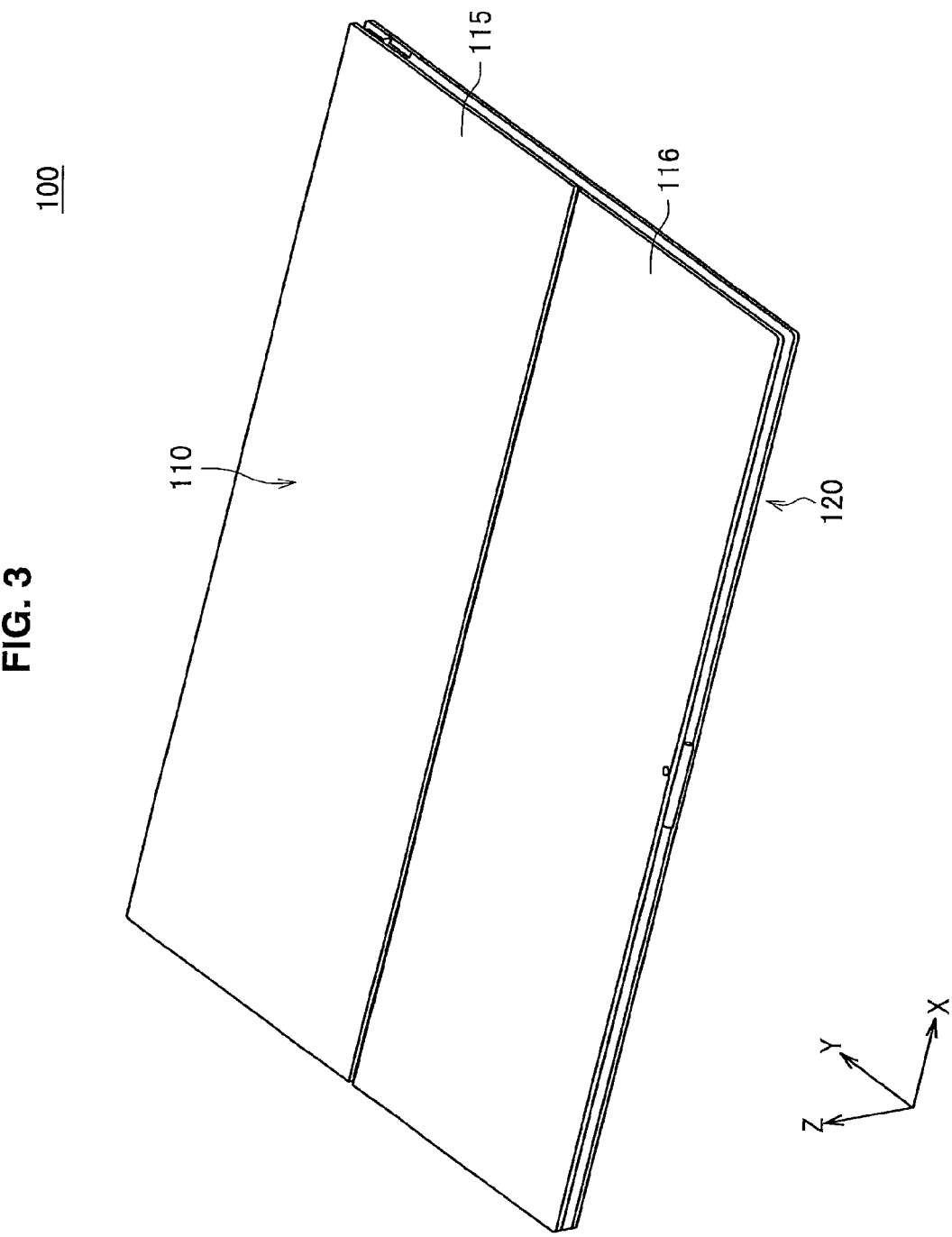
FIG. 3 is a perspective view which shows the electronic apparatus 100 in a closed state.
Figure 4:
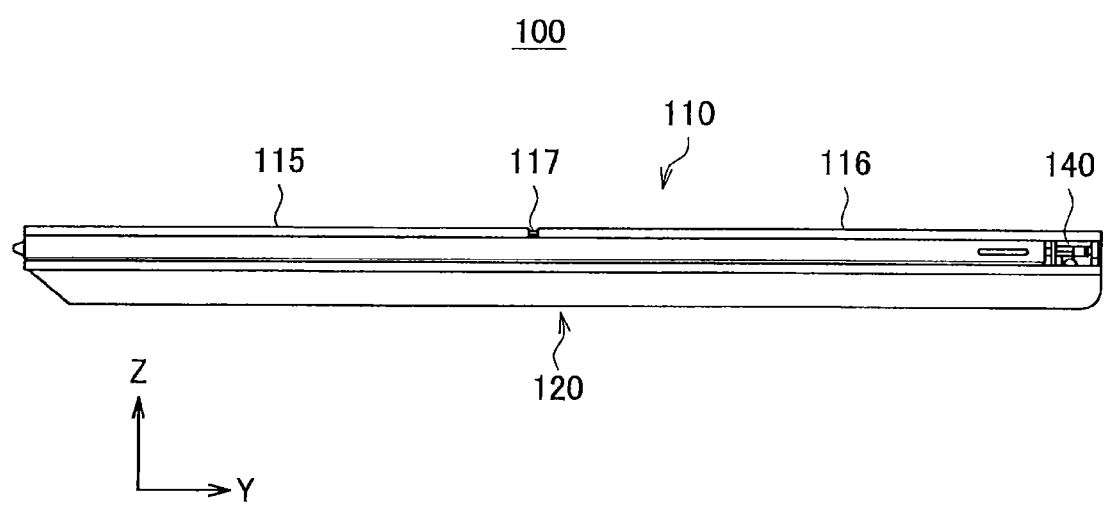
FIG. 4 is a side view of the electronic apparatus 100 shown in FIG. 3.
Figure 5:
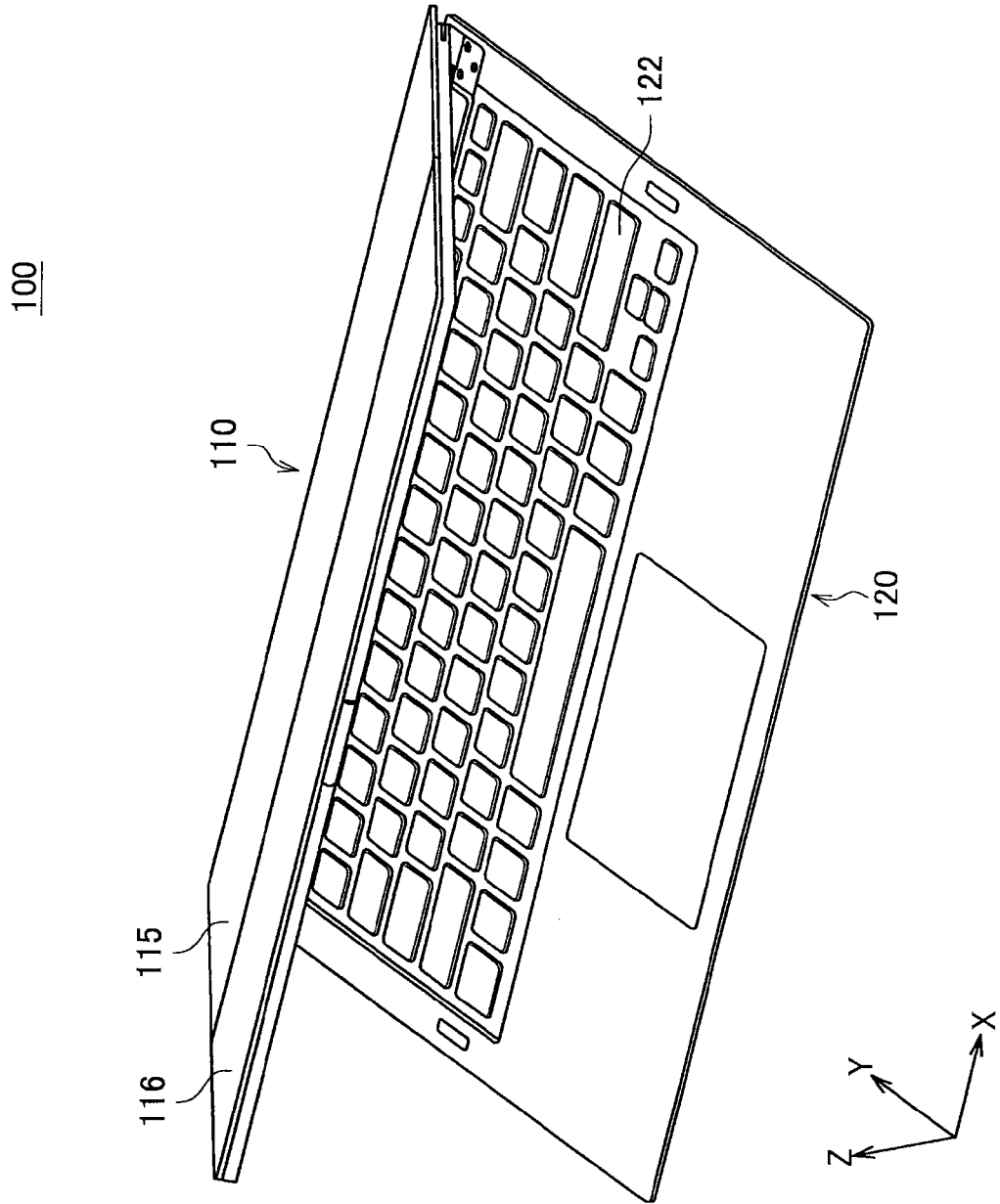
FIG. 5 is a perspective view which shows the electronic apparatus 100 when a display side housing 110 is rotated by hinge mechanism sections 130 and 140.
Figure 6:
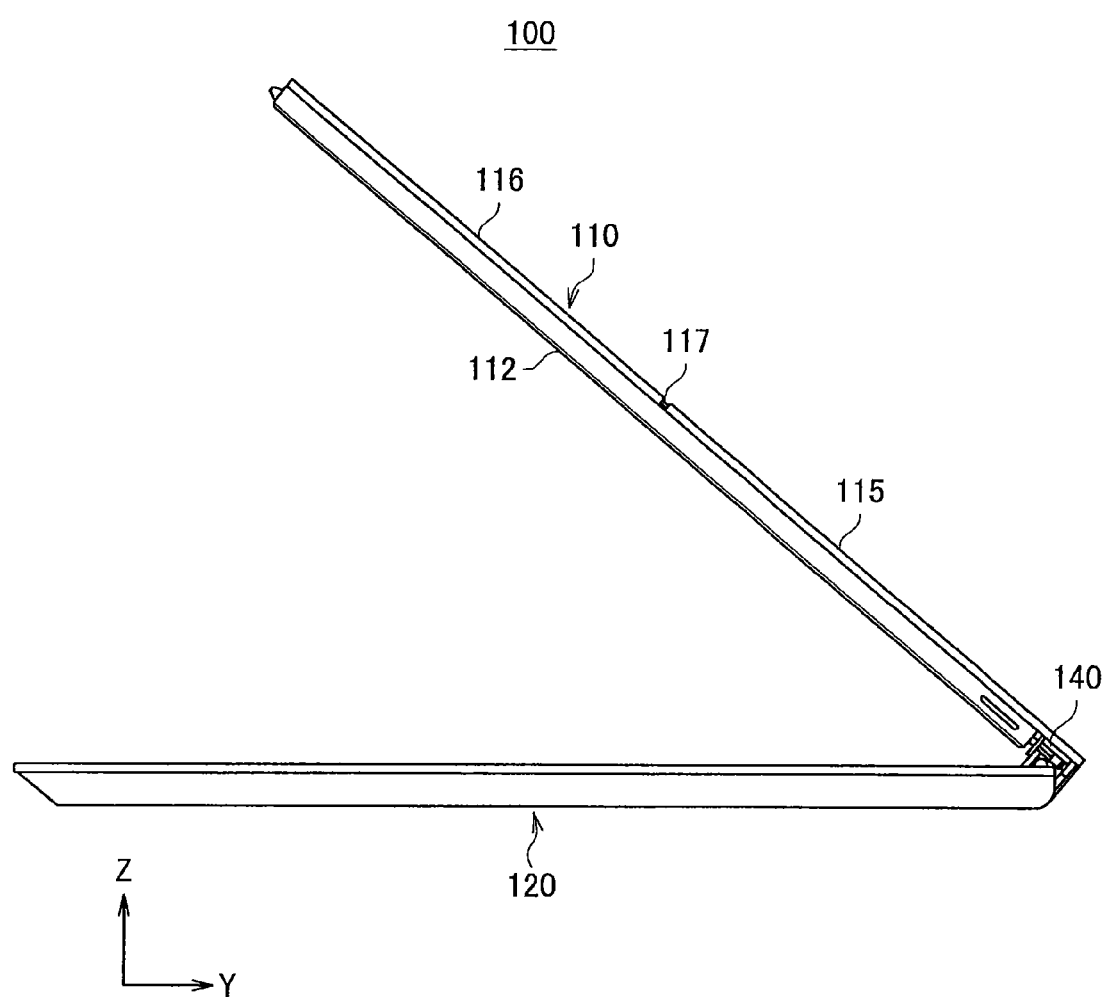
FIG. 6 is a side view of the electronic apparatus 100 shown in FIG. 5.
Figure 7:
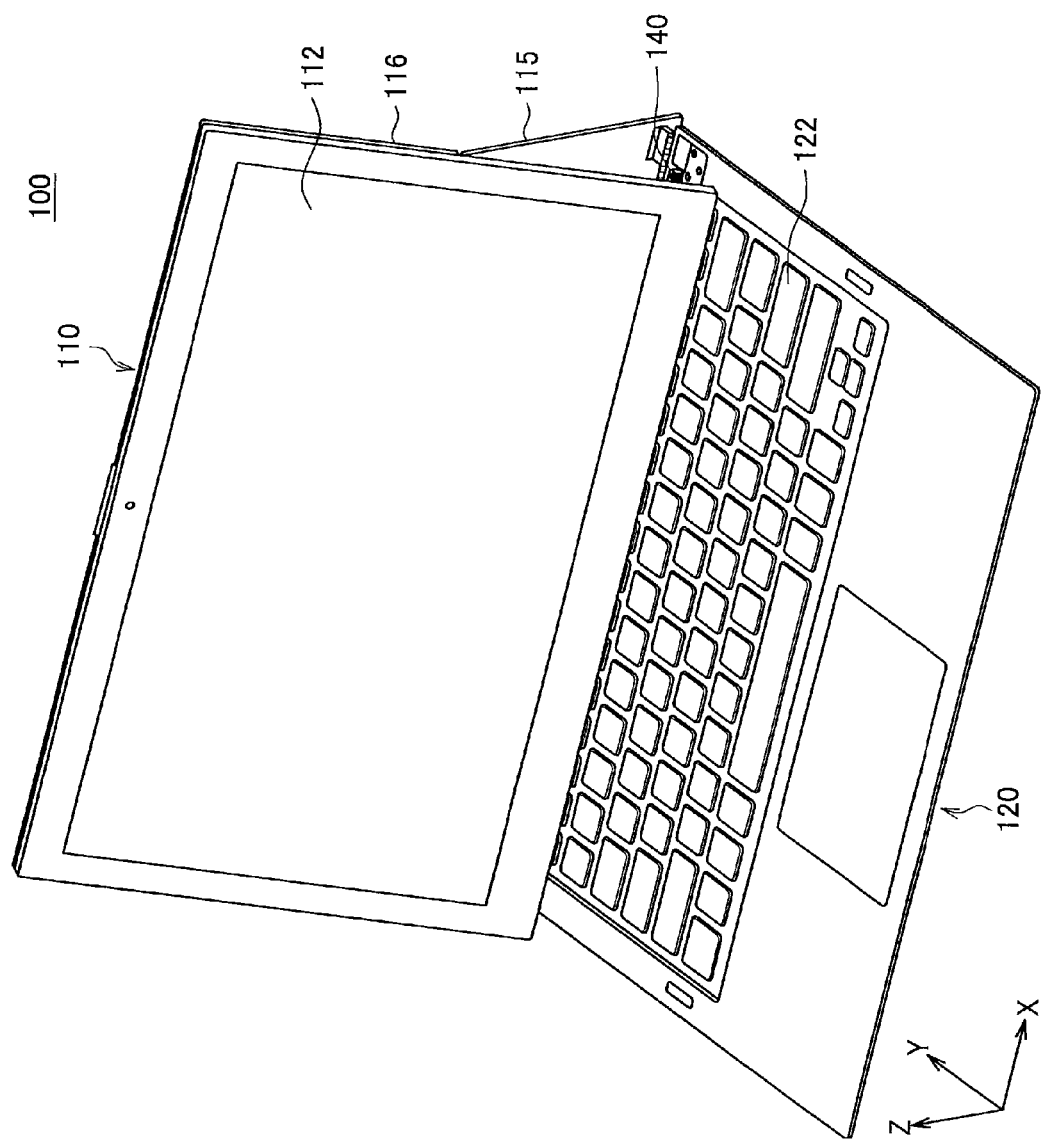
FIG. 7 is a perspective view which shows the electronic apparatus 100 when the display side housing 110 is rotated by a connection bending section 117.
Figure 8:
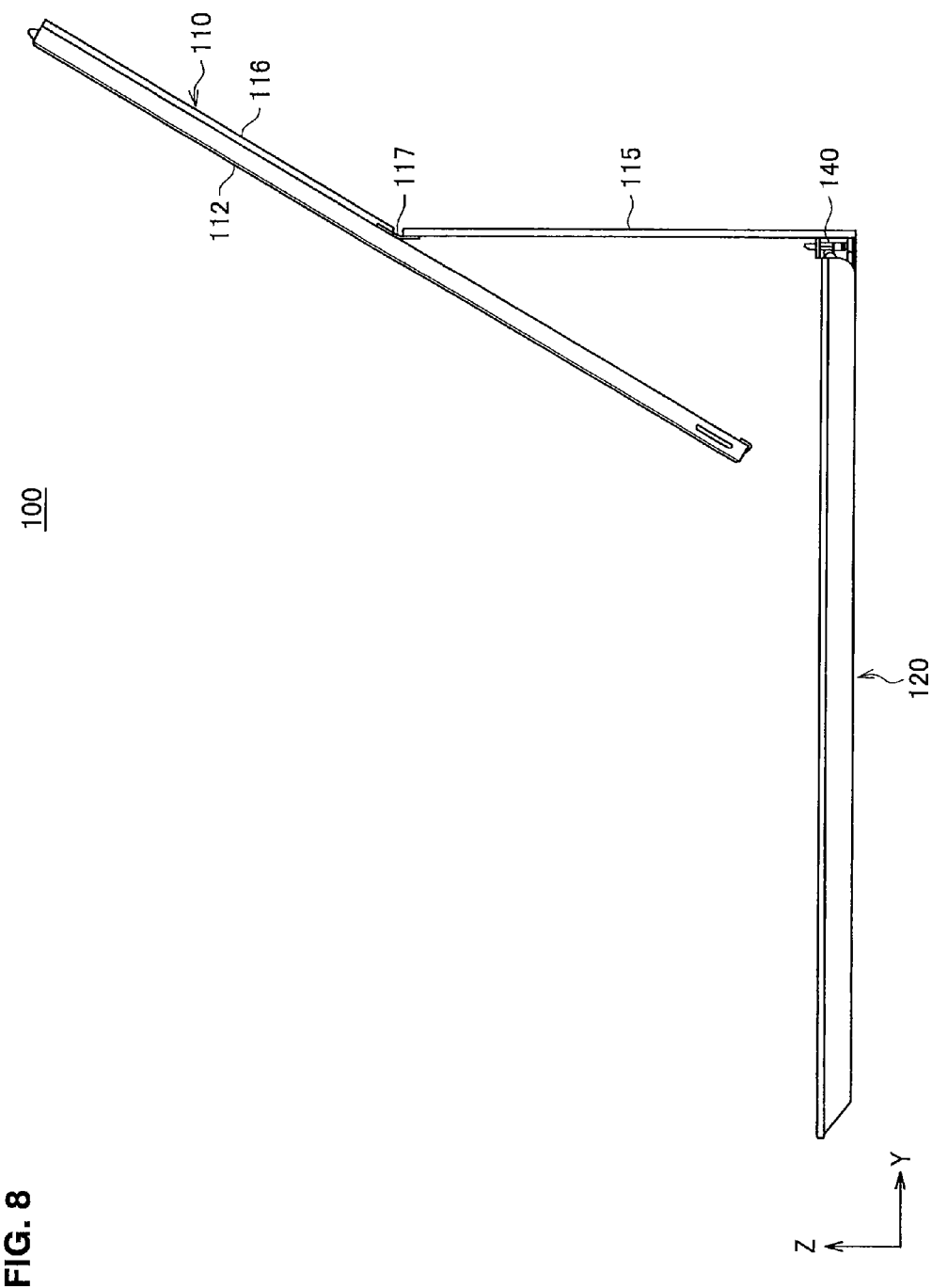
FIG. 8 is a side view of the electronic apparatus 100 shown in FIG. 7.
Figure 9:
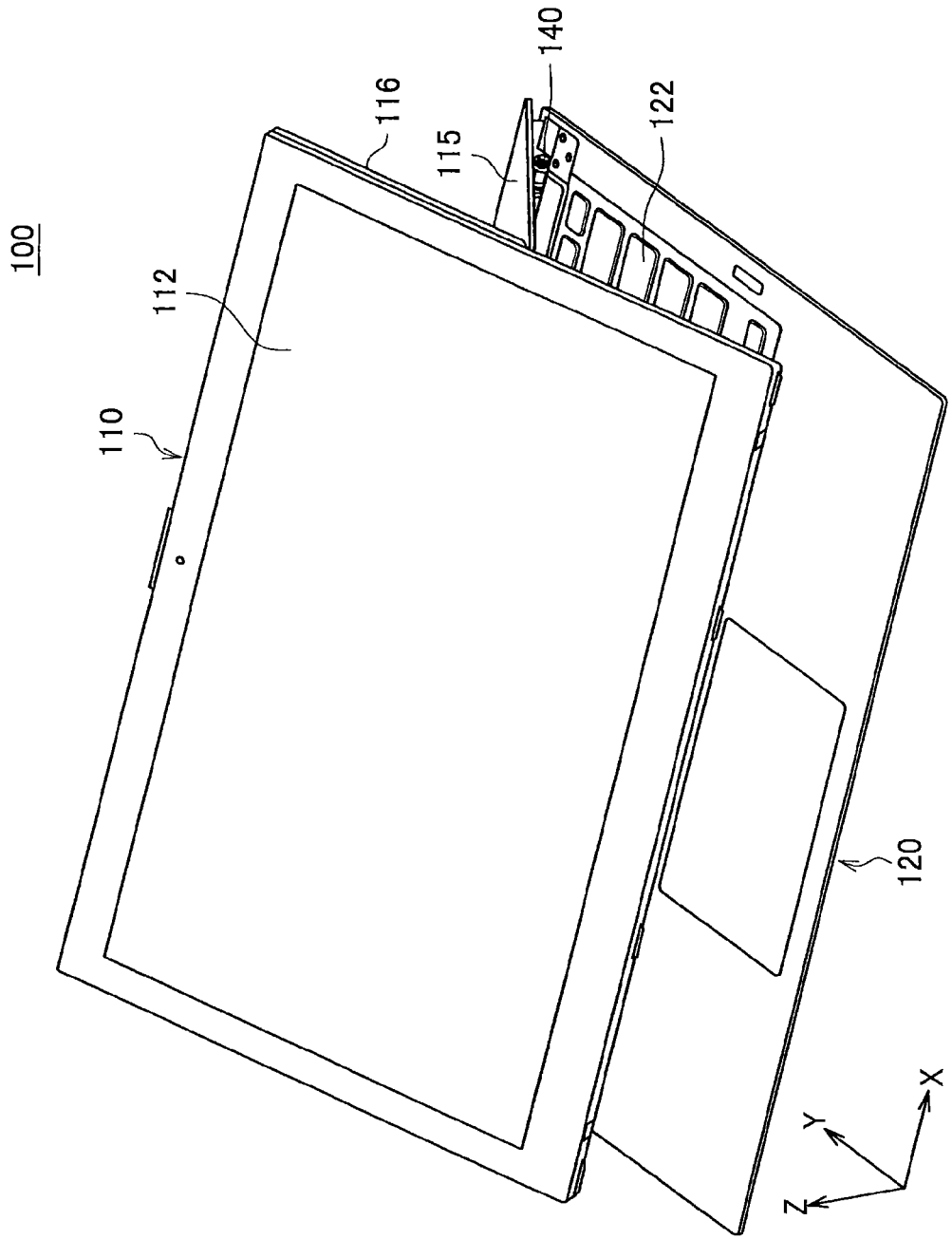
FIG. 9 is a perspective view which shows the electronic apparatus 100 when the display side housing 110 is rotated by the connection bending section 117.
Figure 10:
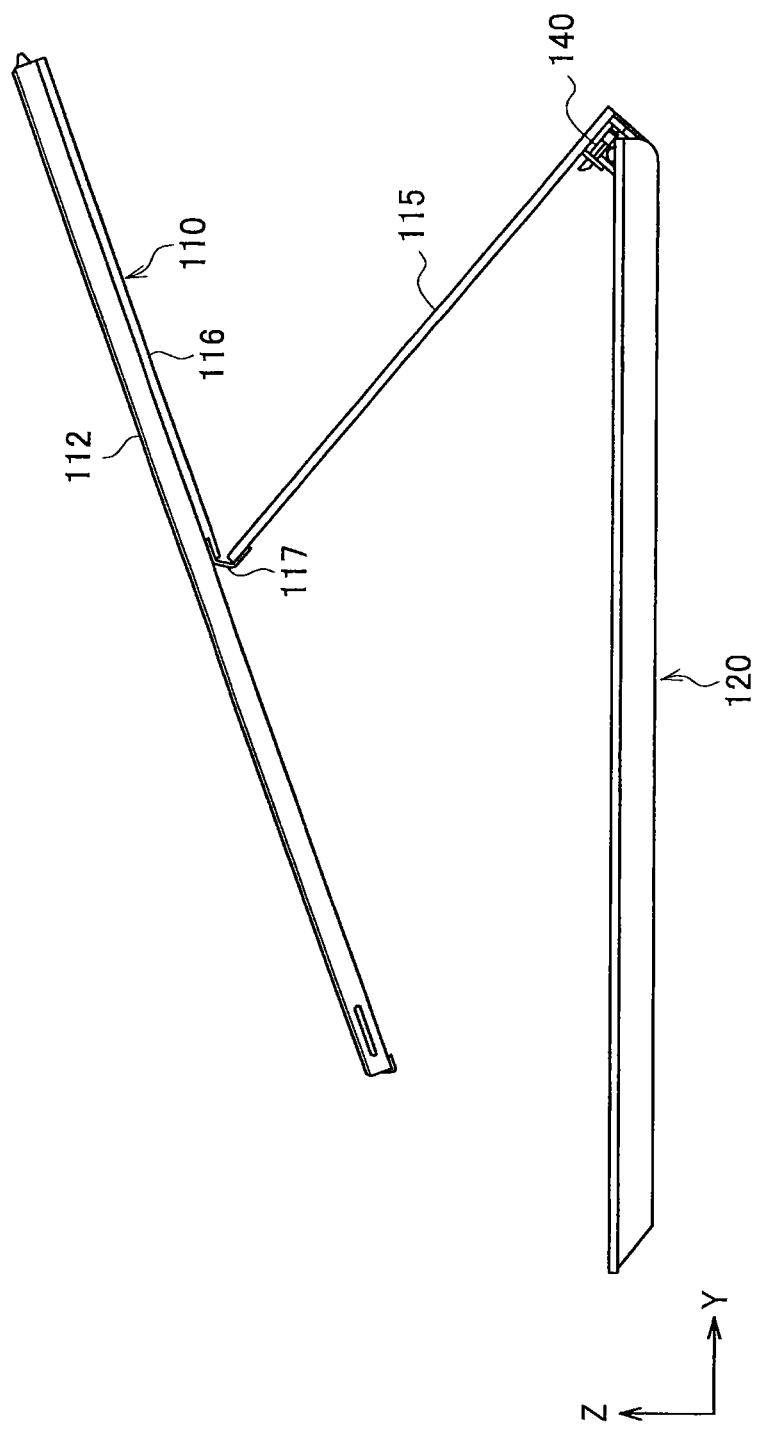
FIG. 10 is a side view of the electronic apparatus 100 shown in FIG. 9.
Figure 11:
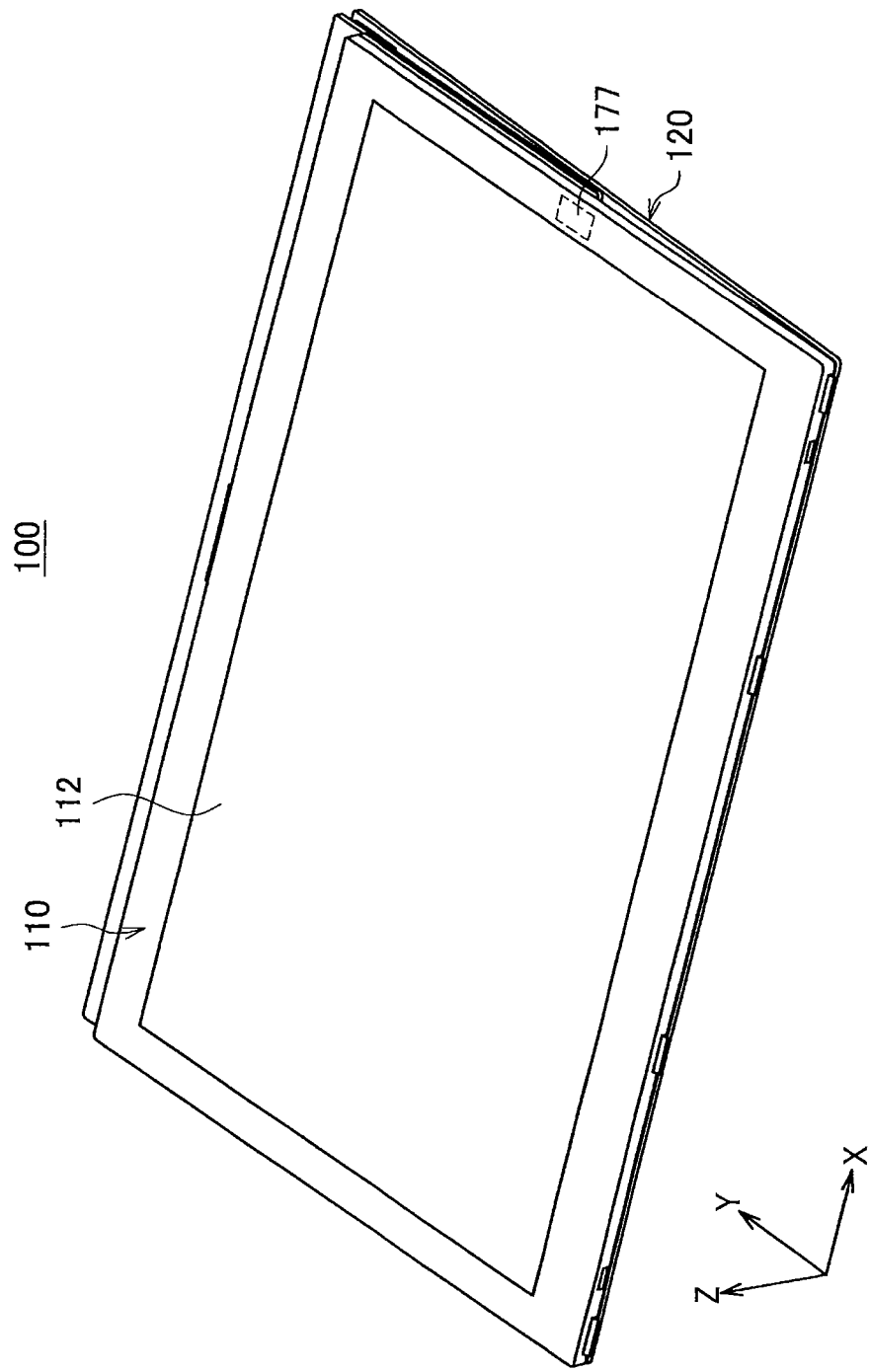
FIG. 11 is a perspective view which shows the electronic apparatus 100 in a reversed state.
Figure 12:
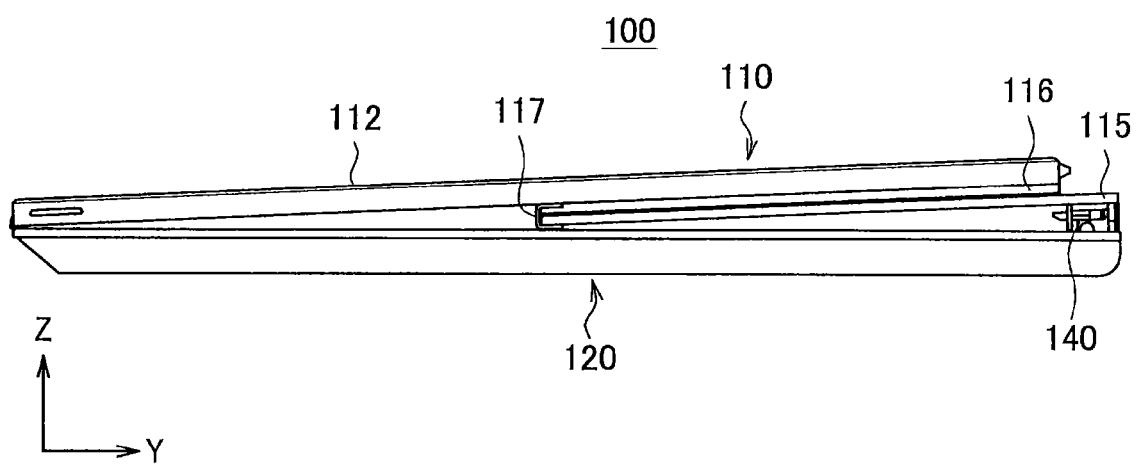
FIG. 12 is a side view of the electronic apparatus 100 shown in FIG. 11.
Figure 13:
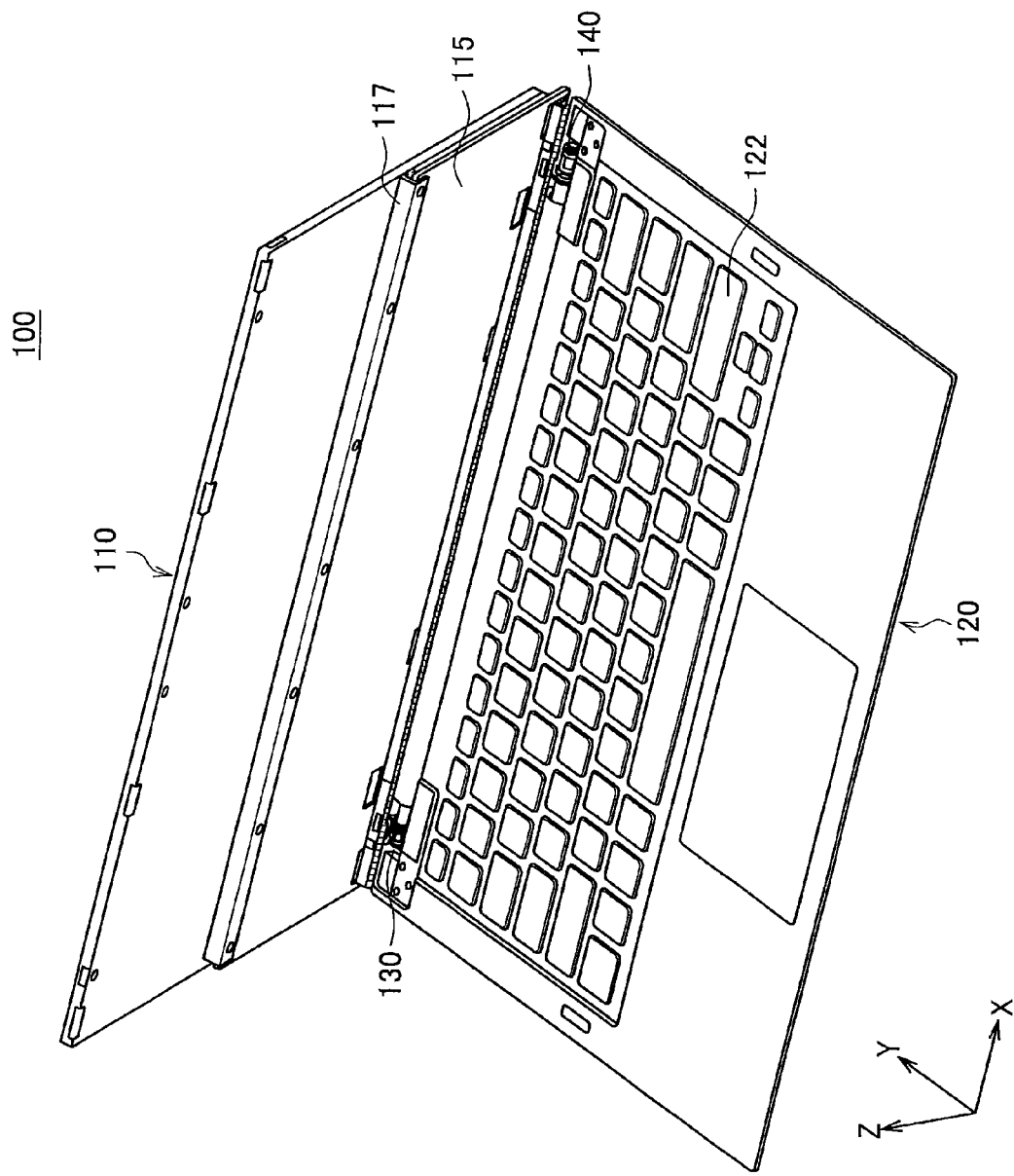
FIG. 13 is a perspective view which shows the electronic apparatus 100 when the display side housing 110 in the reversed state is rotated by the hinge mechanism section 130.
Figure 14:
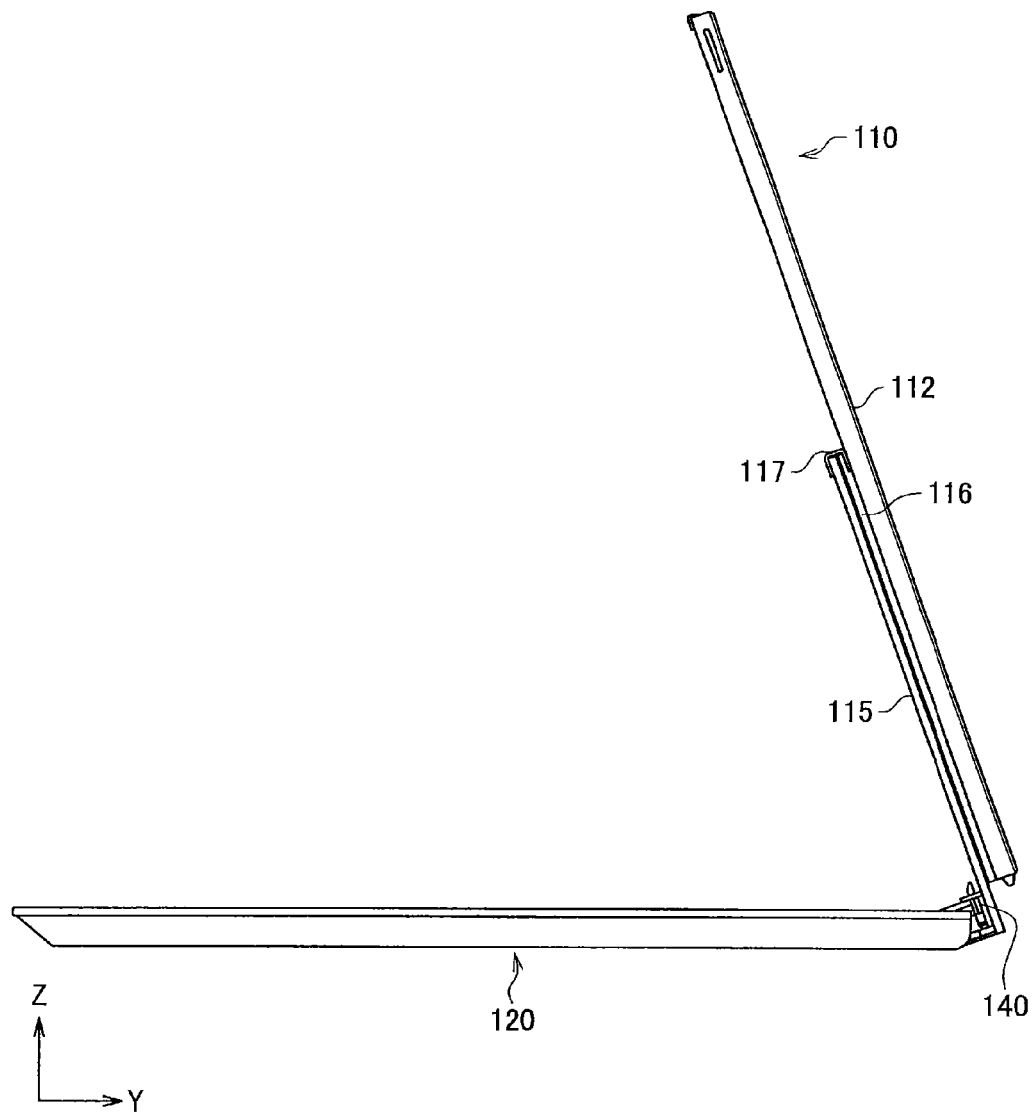
FIG. 14 is a side view of the electronic apparatus 100 shown in FIG. 13.

FIG. 1 is a perspective view which shows an opened state of the electronic apparatus 100 according to an embodiment of the present disclosure. FIG. 2 is a side view of the electronic apparatus 100 shown in FIG. 1. FIG. 3 is a perspective view which shows the electronic apparatus 100 in a closed state. FIG. 4 is a side view of the electronic apparatus 100 shown in FIG. 3. FIG. 5 is a perspective view which shows the electronic apparatus 100 when a display side housing 110 is rotated by hinge mechanism sections 130 and 140. FIG. 6 is a side view of the electronic apparatus 100 shown in FIG. 5. FIG. 7 is a perspective view which shows the electronic apparatus 100 when the display side housing 110 is rotated by a connection bending section 117. FIG. 8 is a side view of the electronic apparatus 100 shown in FIG. 7. FIG. 9 is a perspective view which shows the electronic apparatus 100 when the display side housing 110 is rotated by the connection bending section 117. FIG. 10 is a side view of the electronic apparatus 100 shown in FIG. 9. FIG. 11 is a perspective view which shows the electronic apparatus 100 in a reversed state. FIG. 12 is a side view of the electronic apparatus 100 shown in FIG. 11. FIG. 13 is a perspective view which shows the electronic apparatus 100 when the display side housing 110 in the reversed state is rotated by the hinge mechanism sections 130 and 140. FIG. 14 is a side view of the electronic apparatus 100 shown in FIG. 13.

The electronic apparatus 100 is, for example, a notebook personal computer. As shown in FIG. 1, the electronic apparatus 100 has a display side housing 110, a main body side housing 120, and hinge mechanism sections 130 and 140 which rotatably connect the display side housing 110 and the main body side housing 120. The display side housing 110 and the main body side housing 120 are each flat plate shaped, for example, and are formed with the same size. Note that, in the present embodiment, the main body side housing 120 corresponds to a first housing, the display side housing 110 corresponds to a second housing, and the hinge mechanism sections 130 and 140 correspond to housing connection sections.

The display side housing 110 has a display section 112. The display section 112 is constituted, for example, by a display device such as a liquid crystal display. The display section 112 has a display screen which displays various types of information. Note that, a touch panel capable of being operated by a user's touch is superimposed on the display section 112. In this way, it is possible for a user to perform touch operations when the display side housing 110 is in a reversed state (FIG. 13). That is, it is possible for the electronic apparatus 100 to be used as a so-called tablet.

The main body side housing 120 has an input section 122 which accepts input operations of a user. The input section 122 includes a keyboard, a touch pad or the like such as shown in FIG. 1. The input section 122 detects input operations of the user, and outputs electrical signals corresponding to the input operations. The user performs input operations with the input section 122 when the display side housing 110 is in an opened state (FIG. 1).

The hinge mechanism sections 130 and 140 rotatably connect the display side housing 110 (specifically, a support plate 114) with respect to the main body side housing 120. The hinge mechanism sections 130 and 140 are included on both sides of the long direction (the X direction shown in FIG. 1) of the main body side housing 120. The display side housing 110 rotates, by the hinge mechanism sections 130 and 140, between an opened state (FIG. 1) in which the display side housing 110 is opened with respect to the main body side housing 120, and a closed state (FIG. 3) in which the display side housing 110 is closed with respect to the main body side housing 120. For example, the display side housing 110, which is positioned in the opened state shown in FIG. 1 (FIG. 2), is positioned in the closed state shown in FIG. 3 (FIG. 4), via a rotation state shown in FIG. 5 (FIG. 6) by rotating. Note that, a detailed description of the hinge mechanism sections 130 and 140 will be described later.

Incidentally, the display side housing 110 has a support plate 114, which is an example of a support member which supports the display section 112 on the rear surface side of the display section 112. The size of the support plate 114 is approximately the same as the size of the display section 112. The support plate 114 of the present embodiment has a first support section 115 and a second support section 116, divided into two by sandwiching a small space in the Y direction shown in FIG. 3. The first support section 115 and the second support section 116 are support plates each having approximately the same size.

As shown in FIG. 7, the first support section 115 is connected to the hinge mechanism section 130. The second support section 116 fixedly supports the display section 112 on the rear surface side of the display section 112. The thickness of the first support section 115 is the same size as the thickness of the second support section 116. In this way, when the display side housing 110 is in a closed state, such as shown in FIG. 3, the first support section 115 and the second support section 116 will constitute a flat top plate.

As shown in FIG. 8, a connection bending section 117, which is a support connection section having a flexibility to rotatably connect the second support section 116 with respect to the first support section 115, is included between the first support section 115 and the second support section 116. The connection bending section 117 is constituted to be easily bent, by having additional flexibility. Also, by having the connection bending section 117 bend, the second support section 116, to which the display section 112 is fixedly supported, will rotate with respect to the first support section 115. That is, in the present embodiment, the rotation form of the display section 112 is changed by the hinge mechanism sections 130 and 140, and the connection bending section 117.

For example, by having the second support section 116 rotate with respect to the first support section 115 by the connection bending section 117, the display side housing 110 in the opened state shown in FIG. 1 is positioned in the reversed state shown in FIG. 11 (FIG. 12) in which the display section 112 is reversed, via the rotation states shown in FIG. 7 (FIG. 8) and FIG. 9 (FIG. 10). Since the display section 112 is inclined with respect to the main body side housing 120 in the reversed state, such as shown in FIG. 12, it becomes easy for a user to view information displayed on the display section 112. Note that, a detailed configuration of the connection bending section 117 will be described later.

In addition, in the electronic apparatus 100, the display side housing 110 can be allowed to rotate, in a state in which the display section 112 is positioned in the reversed state, such as shown in FIG. 13 (FIG. 14). In this way, the user can show the display section 112 to a person facing the user.

Incidentally, a plurality of magnets are built into the electronic apparatus 100, in order to retain a state of the rotating display side housing 110. Hereinafter, state retention of the display side housing 110 by the magnetic force of magnets will be described with reference to FIG. 15.

Figure 15:
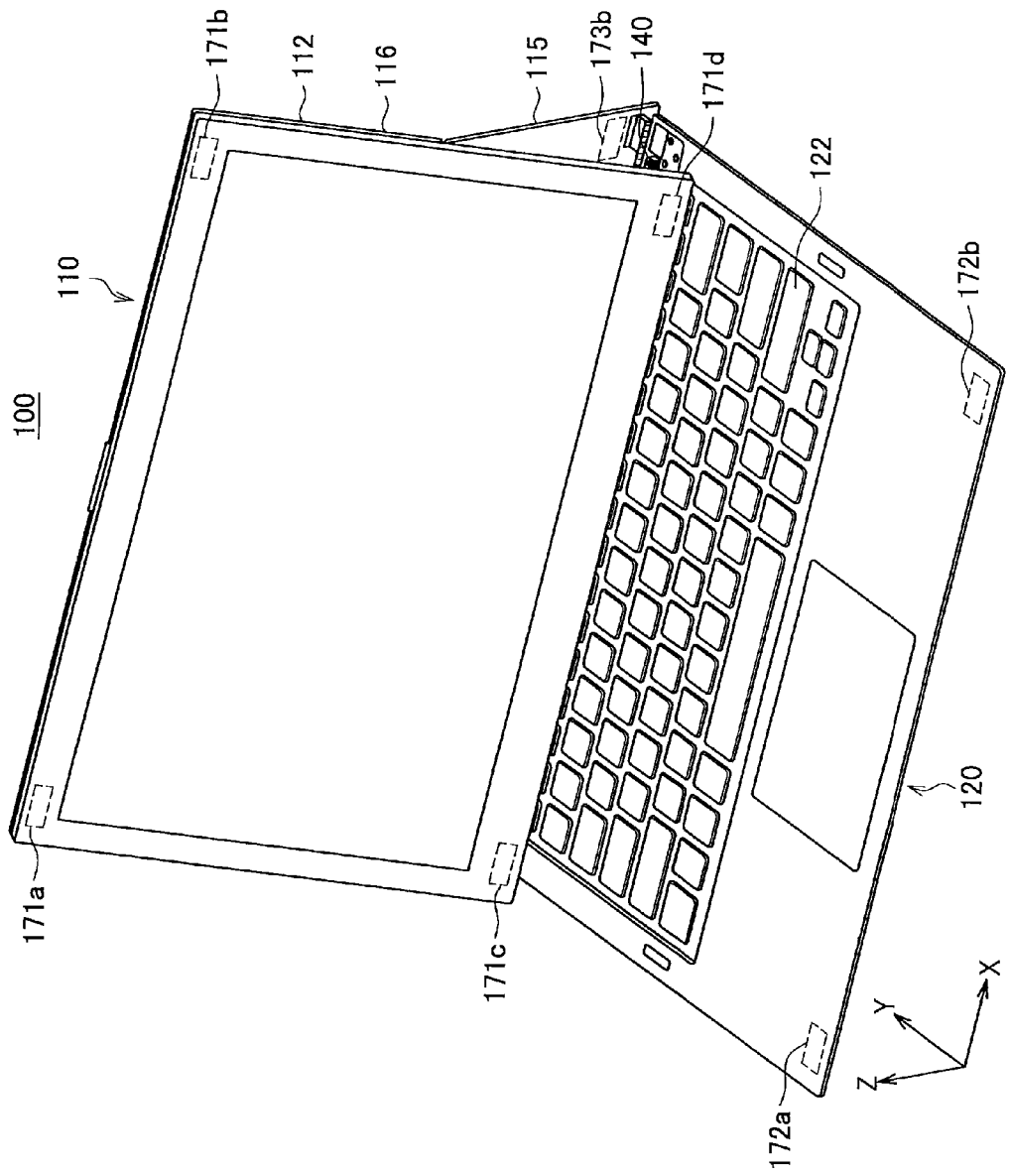
FIG. 15 is a figure for describing the positions of magnets built into the electronic apparatus 100.

FIG. 15 is a figure for describing the positions of magnets built into the electronic apparatus 100. The display side housing 110 has magnets 171a, 171b, 171c and 171d built into the four corners of the housing. The main body side housing 120 has magnets 172a and 172b built into positions corresponding to the magnets 171a and 171b when the display side housing 110 is in the closed state (FIG. 1). The first support section 115 of the support plate 114 has magnets 173a and 173b (refer to FIG. 22) built into both corners of the hinge mechanism section 130 side.

Also, when the display side housing 110 is positioned in the closed state, an attractive force acts between the magnet 171a (171b) and the magnet 172a (172b), and an attractive force acts between the magnet 171c (171d) and the magnet 173a (173b), and the closed state of the display side housing 110 becomes easy to retain. Further, when the display side housing 110 is positioned in the reversed state, an attractive force acts between the magnet 171a (171b) and the magnet 172a (172b), and an attractive force acts between the magnet 171c (171d) and the magnet 173a (173b), and the reversed state of the display side housing 110 becomes easy to retain.

Further, the display section 112 is retained on the first support section 115, by having an attractive force act between the magnet 171c (171d) and the magnet 173a (173b), in a state in which the connection bending section 117 is not bent (FIG. 6 or the like). In this way, the display side housing 110 rotates in a state in which the first support section 115 retains the display section 112.

Further, a driving substrate which controls the display of the display section 112 is included in the electronic apparatus 100. In the present embodiment, the driving substrate of the display section 112 is included within the display side housing 110 out of the display side housing 110 and the main body side housing 120.

Figure 16:
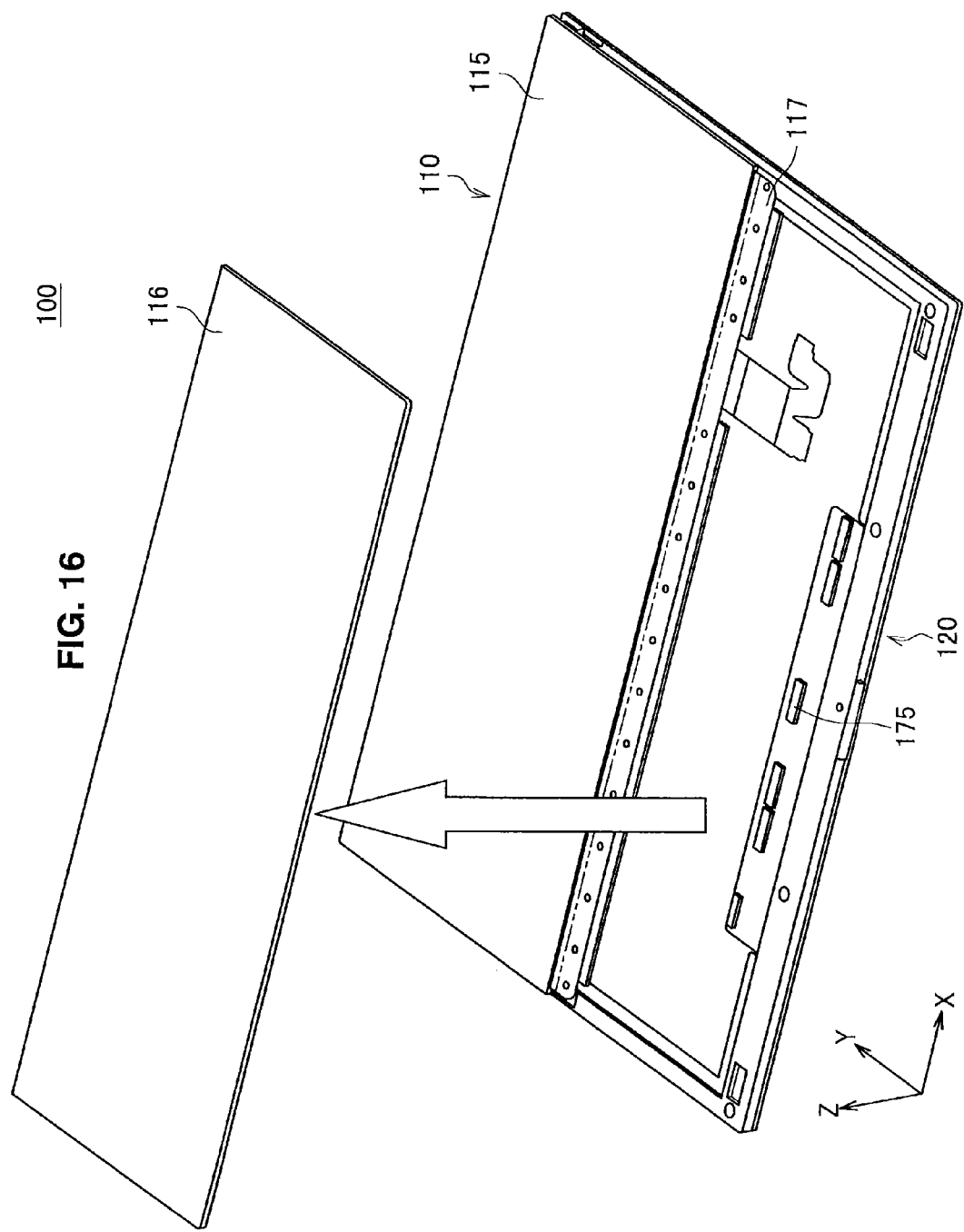
FIG. 16 is a figure for describing the position of a driving substrate 175 of the display section 112.

FIG. 16 is a figure for describing the position of the driving substrate 175 of the display section 112. In FIG. 16, the second support section 116 is detached from the display side housing 110. The driving substrate 175 is included on the rear surface of the display section 112, and is positioned facing the second support section 116. In this way, the first support section 115 and the second support section 116 become the same surface, while an increase in the thickness of the display side housing 110 is suppressed.

Further, the electronic apparatus 100 has an NFC antenna 177 which is a wireless communication section for performing near field wireless communication. The NFC antenna 177 is included on the display section 112 side of the display side housing 110. Specifically, as shown in FIG. 11, the NFC antenna 177 is arranged next to the display section 112 (display screen). By allowing such an arrangement of the NFC antenna 177, since the NFC antenna 177 will face outwards in either the case where the display side housing 110 is in the opened state (FIG. 1) or the reversed state (FIG. 11), wireless communication can be appropriately performed.

(1-2. Connection Bending Section 117 and Peripheral Configuration)

An example of the connection bending section 117 and a peripheral configuration according to the present embodiment will be described with reference to FIG. 17 to FIG. 20.

Figure 17:
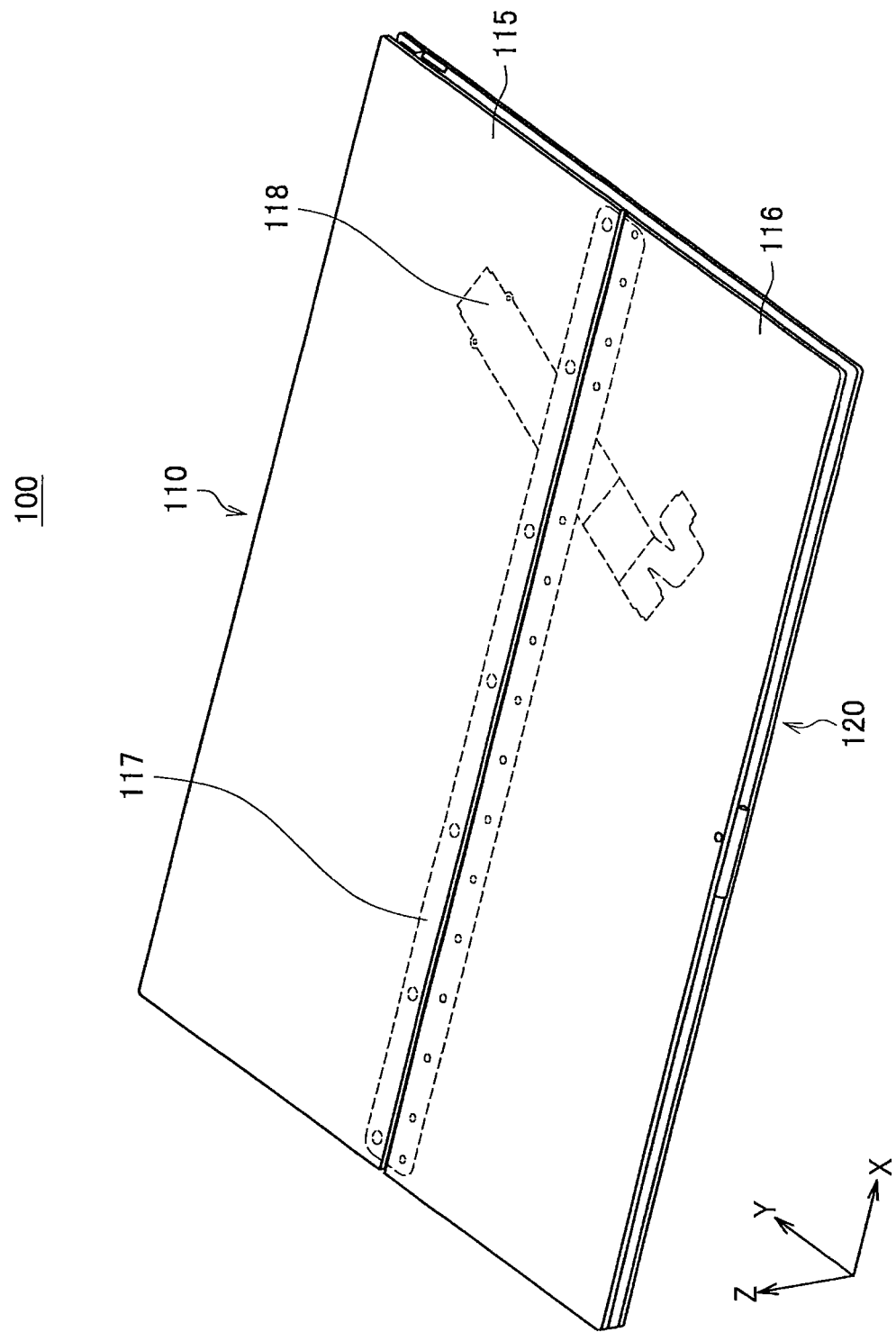
FIG. 17 is a figure for describing the attachment position of the connection bending section 117.
Figure 18:
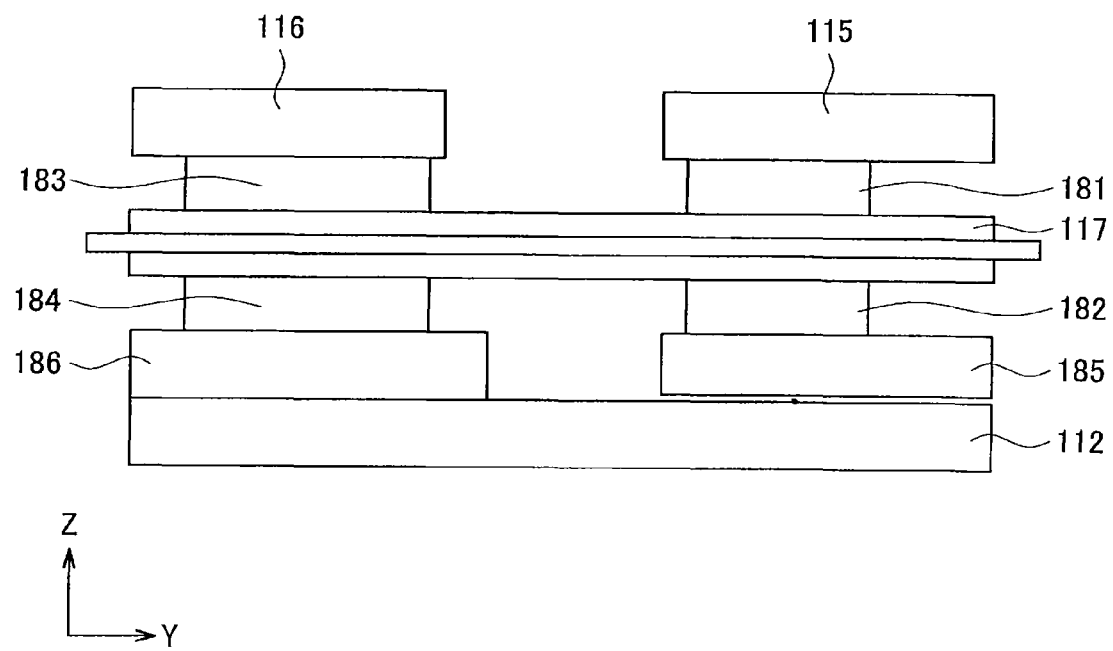
FIG. 18 is a cross-sectional view for describing the attachment structure of the connection bending section 117.
Figure 19:
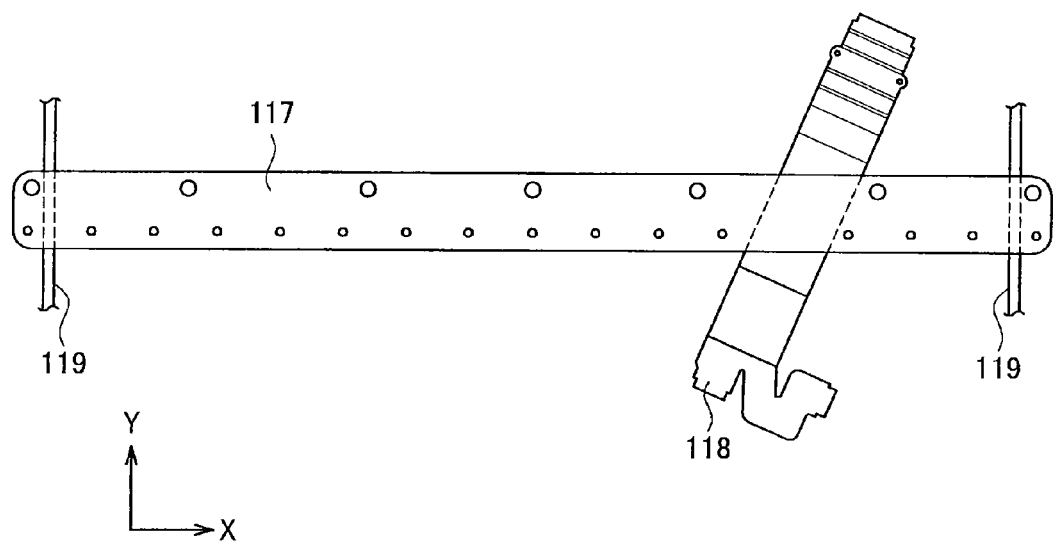
FIG. 19 is a plan view which shows an example of the configuration of the connection bending section 117.
Figure 20:
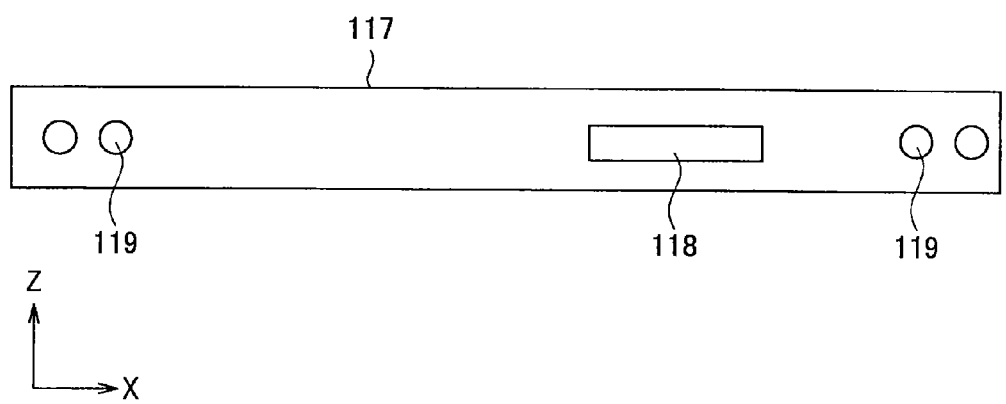
FIG. 20 is a cross-sectional view which shows an example of the configuration of the connection bending section 117.

FIG. 17 is a figure for describing the attachment position of the connection bending section 117. FIG. 18 is a cross-sectional view for describing the attachment structure of the connection bending section 117. FIG. 19 is a plan view which shows an example of the configuration of the connection bending section 117. FIG. 20 is a cross-sectional view which shows an example of the configuration of the connection bending section 117.

The connection bending section 117 rotatably connects the second support section 116, to which the display section 112 is fixedly supported, with respect to the first support section 115 around the long direction (the X direction shown in FIG. 17). The connection bending section 117 is included only for a length equivalent to the width of the display side housing 110, along the long direction (the X direction shown in FIG. 17) at the center side of the display side housing 110.

The connection bending section 117 is, for example, a sheet shaped member which has a prescribed thickness. In this way, since the thickness of the connection bending section 117 can be reduced, an increase in the thickness of the electronic apparatus 100 can be suppressed even if the connection bending section 117 is included. The connection bending section 117 is formed, for example, by a rubber or an elastomer. In this way, the flexibility of the connection bending section 117 can be secured, and the thickness of the connection bending section 117 can be reduced. Note that, the material of the connection bending section 117 is not limited to that described above, and may be a synthetic material, for example.

The connection bending section 117 is sandwiched between the display section 112 and the first support section 115 and second support section 116. Also, one end side of the short direction (the Y direction shown in FIG. 17) of the connection bending section 117 is fixed to the rear surface of the first support section 115 of the support plate 114. Further, the other end side of the short direction of the connection bending section 117 is fixed to the rear surface of the second support section 116.

Specifically, as shown in FIG. 18, one end side of the connection bending section 117 is fixed to the first support section 115 via a tape 181, and is fixed to a frame 185 via a tape 182. Similarly, the other end side of the connection bending section 117 is fixed to the second support section 116 via a tape 183, and is fixed to a frame 186 of the display section 112 via a tape 184.

When the second support section 116 rotates with respect to the first support section 115, the short direction of the connection bending section 117 will bend. In this way, the user can reverse the display section 112 fixedly supporting the second support section 116.

By including the above described connection bending section 117, in the case where the connection bending section 117 is in an unbent state and the display side housing 110 is in a closed state with respect to the main body side housing 120, the display section 112 will face an operation surface 121 (FIG. 1) which is the main surface of the main body side housing 120. On the other hand, in the case where the connection bending section 117 is in a bent state and the display side housing 110 is in a closed state with respect to the main body side housing 120, the support plate 114 will face the operation surface 121 of the main body side housing 120.

Incidentally, as shown in FIG. 19 and FIG. 20, a flexible cable 118, which is a planar wiring cable connected between the main body side housing 120 and the display side housing 110, passes through the inside of the connection bending section 117. The flexible cable 118 connects a substrate included within the main body side housing 120 and a substrate included within the display side housing 110. When the connection bending section 117 bends in accordance with the rotation of the second support section 116, which fixedly supports the display section 112, with respect to the first support section 115, the flexible cable 118 also interlockingly bends.

As shown in FIG. 19, the flexible cable 118 is arranged so as to be inclined with respect to the short direction of the connection bending section 117 inside of the connection bending section 117. By allowing such an arrangement of the flexible cable 118, the flexibility of the flexible cable 118 will be improved when compared to the case of arranging the flexible cable 118 in parallel with the short direction of the connection bending section 117. As a result, breaking of the flexible cable 118 can be suppressed, even if the flexible cable 118 is repeatedly bent in accordance with the bending of the connection bending section 117.

Further, as shown in FIG. 19 and FIG. 20, wires 119 are embedded inside of both end sides of the long direction of the connection bending section 117. The wires 119 are included so as to be orthogonal with respect to the connection bending section 117. By including such wires 119, expansion due to repeating the bending of the connection bending section 117 can be suppressed.

Note that, while a description has been made in which the flexible cable 118 is arranged so as to be inclined with respect to the short distance of the connection bending section 117, the present disclosure is not limited to this. For example, the flexible cable 118 may be arranged so as to be parallel with the short direction of the connection bending section 117. In such a case, it is preferable to use a material for the flexible cable 118 which has a high rigidity.

Further, while the above described wires 119 are embedded inside of the connection bending section 117, the present disclosure is not limited to this, and the wires 119 may not be embedded in the connection bending section 117.

(1-3. Detailed Configuration of the Hinge Mechanism Sections 130 and 140)

As described above, hinge mechanism sections 130 and 140, which allow the display side housing 110 to rotate, are included on both sides of the long direction (the X direction shown in FIG. 1) of the main body side housing 120. Hereinafter, a detailed configuration of the hinge mechanisms sections 130 and 140 will be described with reference to FIG. 21 to FIG. 28.

Figure 21:
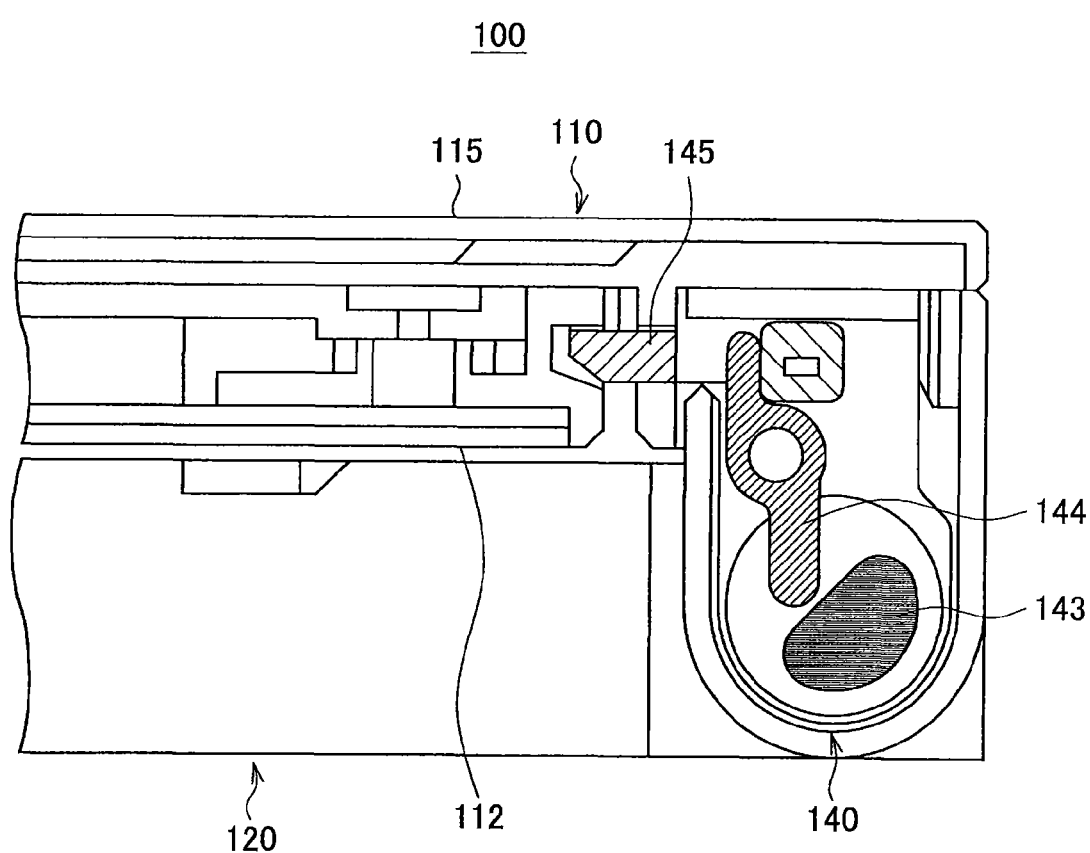
FIG. 21 is a cross-sectional view which shows a state of the hinge mechanism sections when the display side housing 110 is in the closed state.
Figure 22:
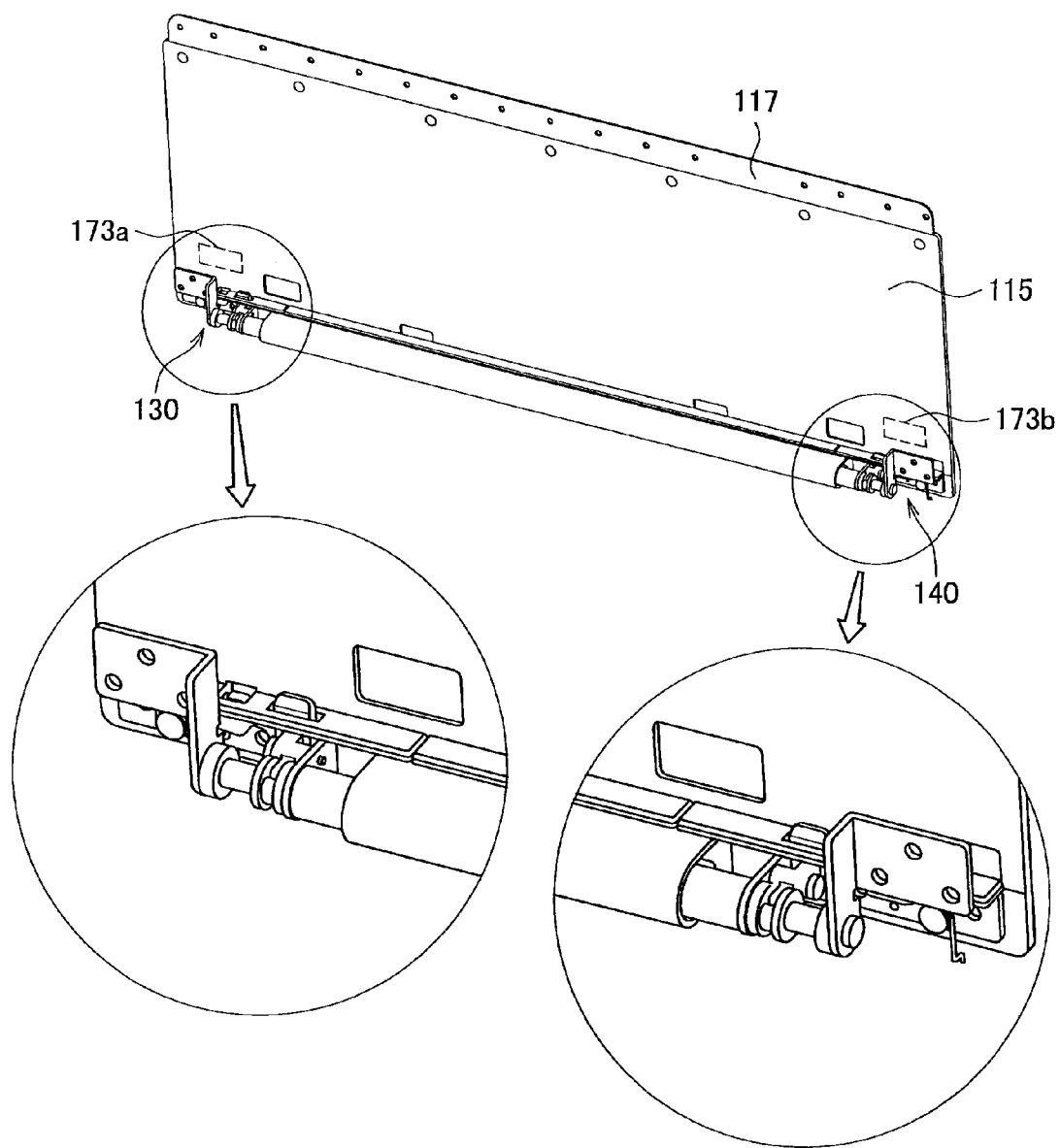
FIG. 22 is a perspective view which shows a state of the hinge mechanism sections when the display side housing 110 is in the closed state.
Figure 23:
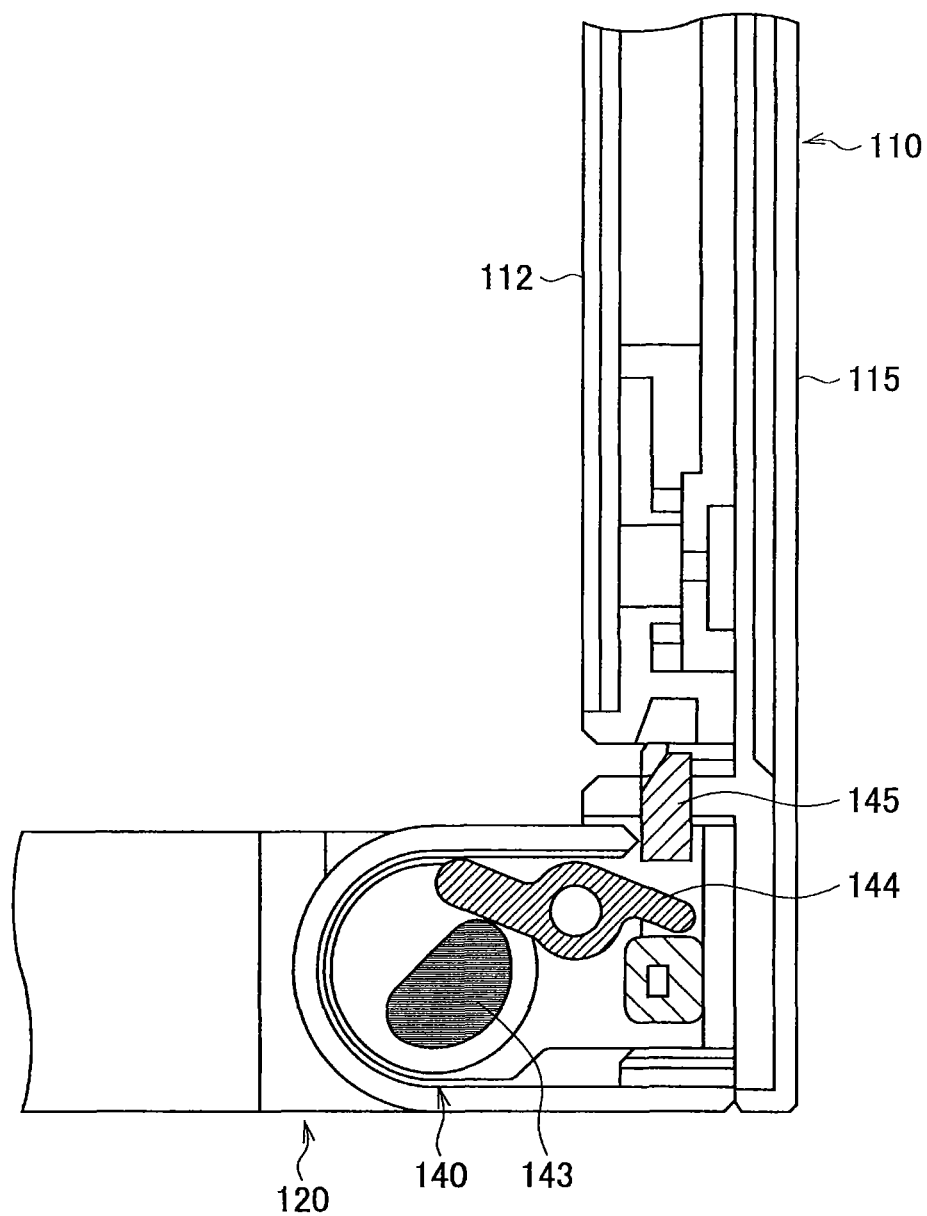
FIG. 23 is a cross-sectional view which shows a state of the hinge mechanism sections when the display side housing 110 is in the opened state.
Figure 24:
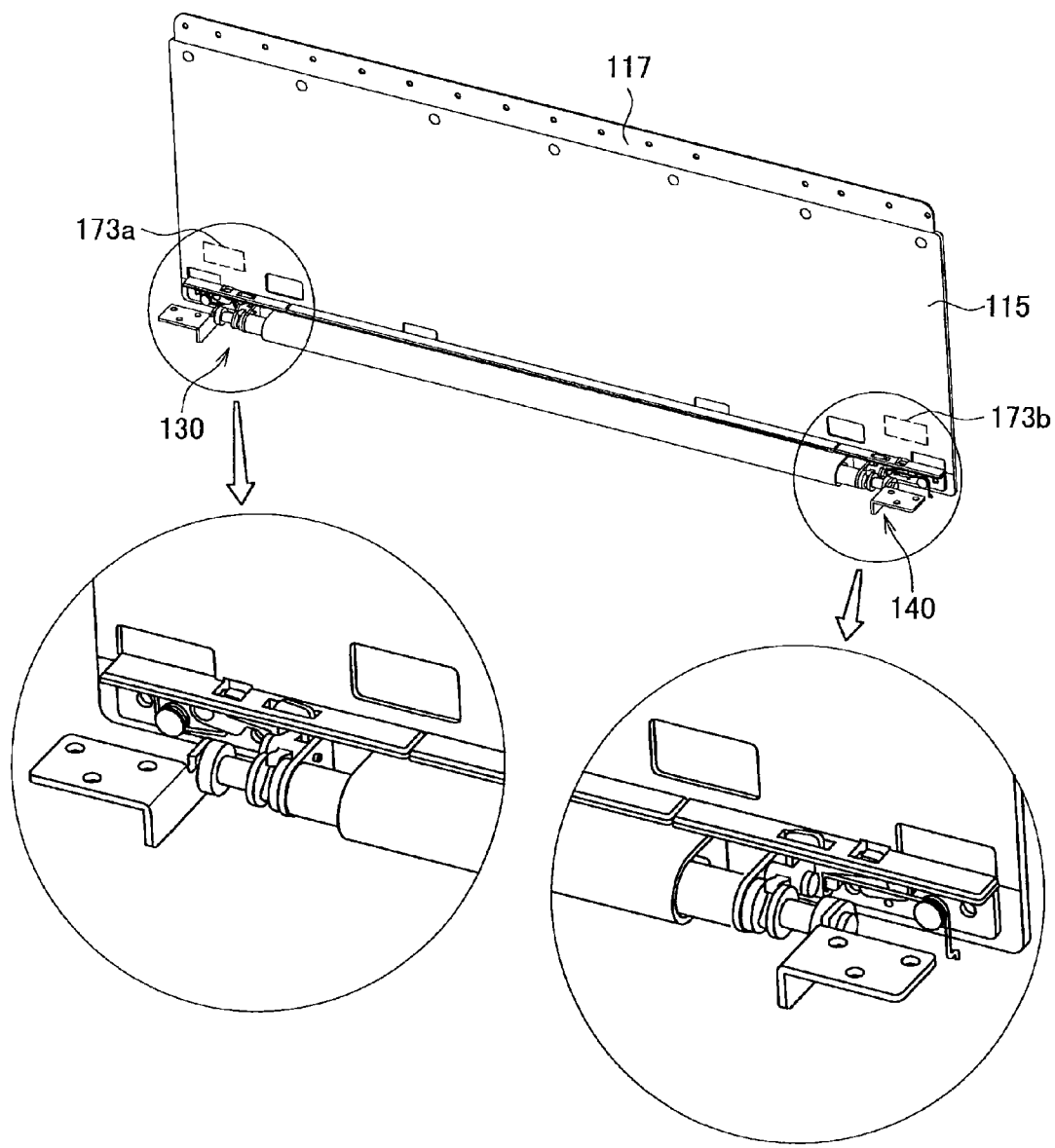
FIG. 24 is a perspective view which shows a state of the hinge mechanism sections when the display side housing 110 is in the opened state.
Figure 25:
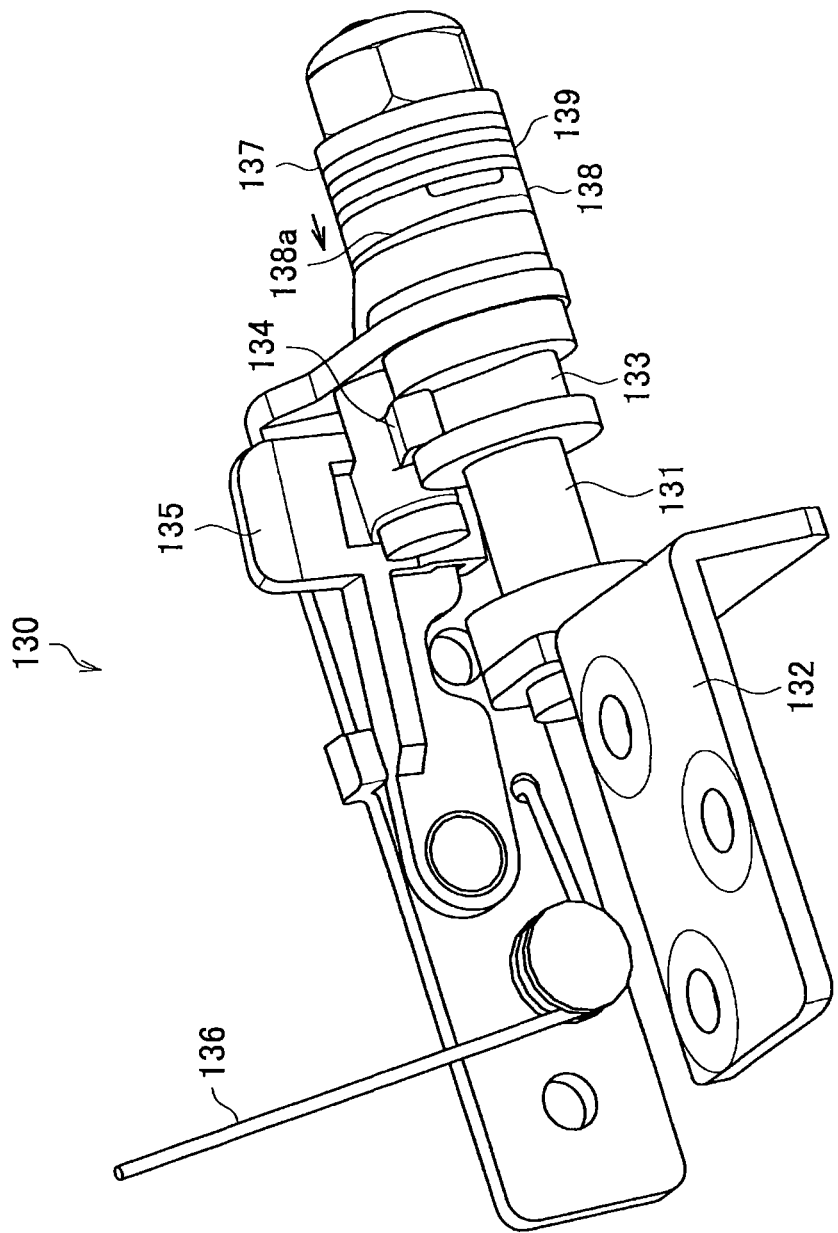
FIG. 25 is a perspective view which shows a detailed configuration of the hinge mechanism section 130.
Figure 26:
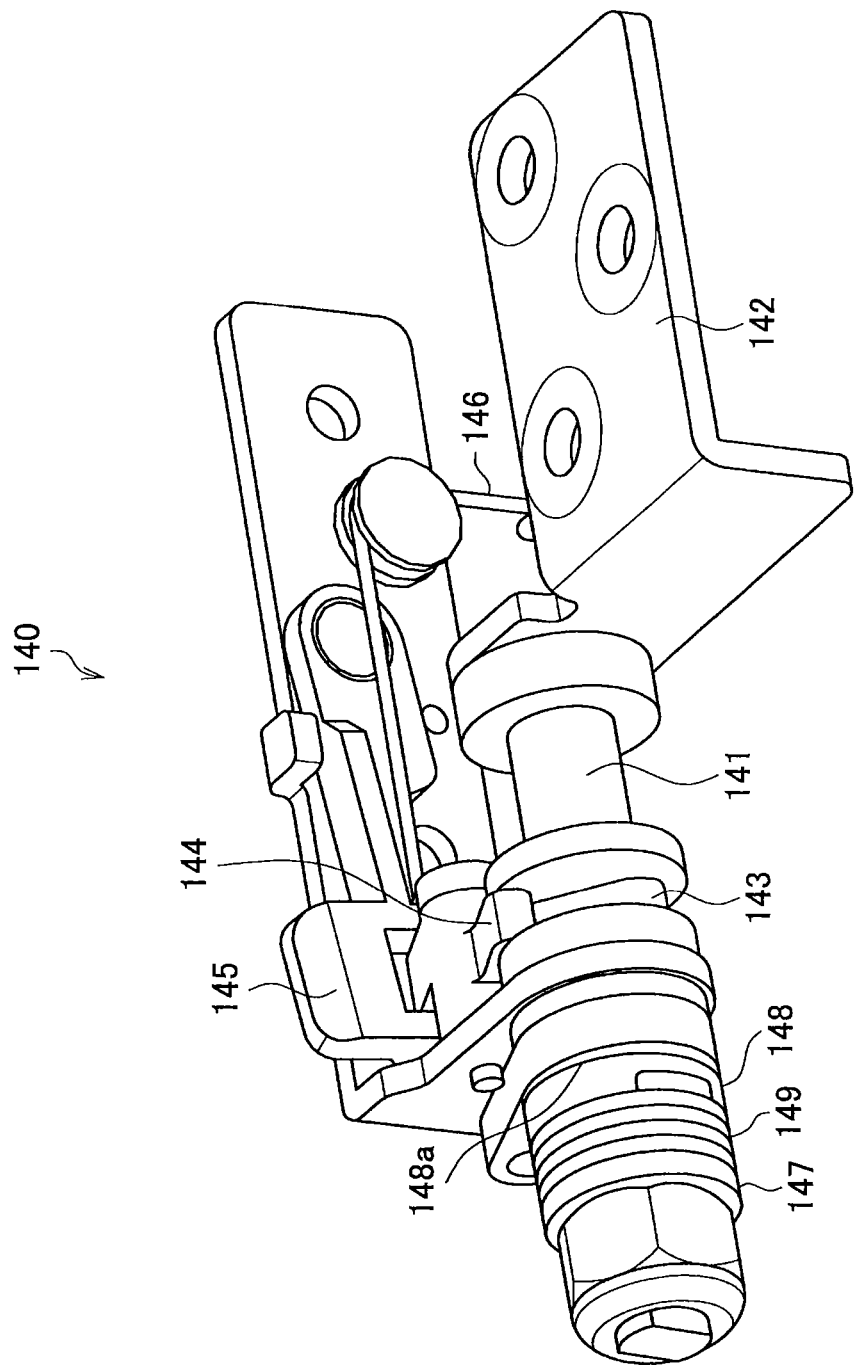
FIG. 26 is a perspective view which shows a detailed configuration of the hinge mechanism section 140.
Figure 28:
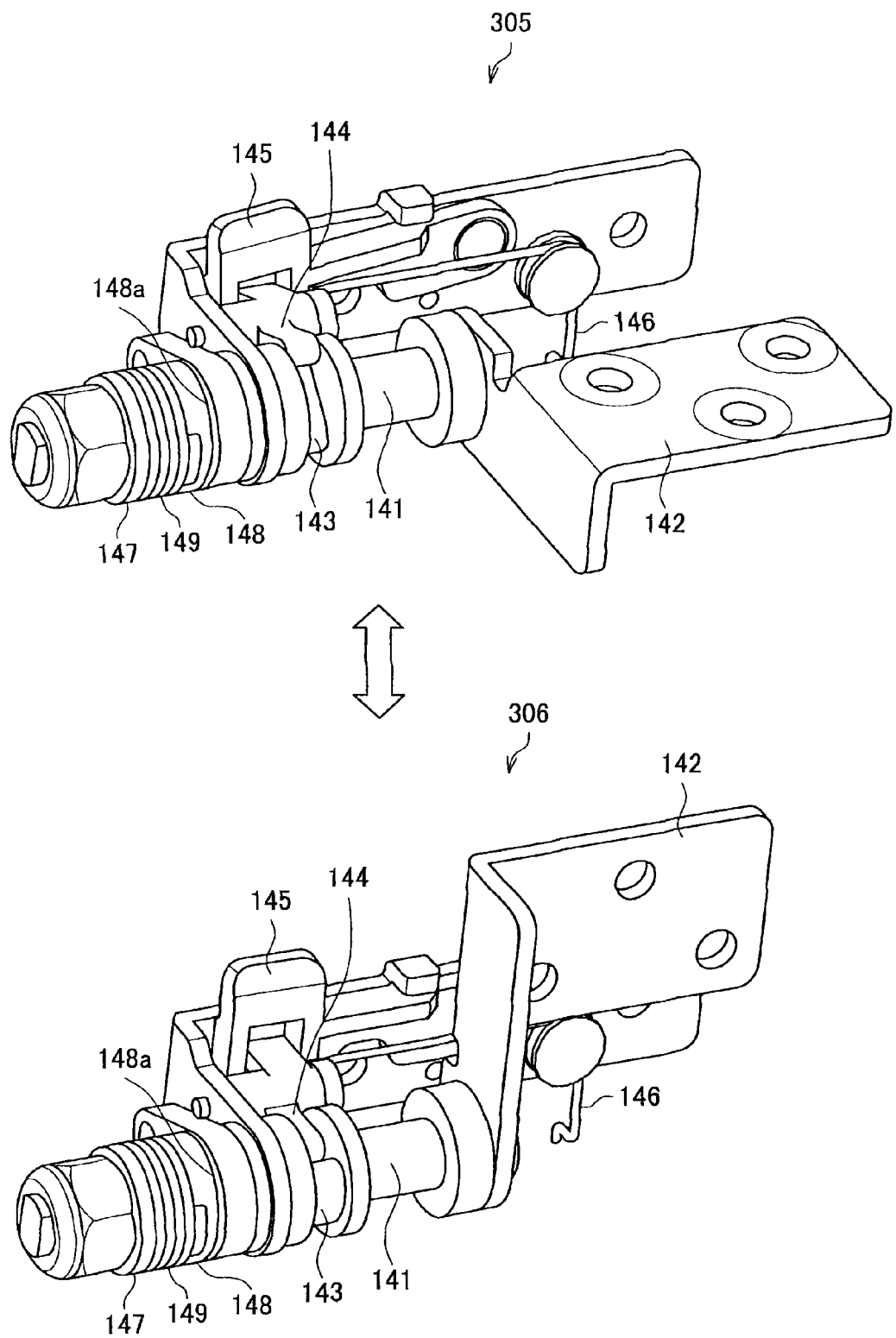
FIG. 28 is a figure for describing an operation example of the hinge mechanism section 140.

FIG. 21 is a cross-sectional view which shows a state of the hinge mechanism sections when the display side housing 110 is in the closed state. FIG. 22 is a perspective view which shows a state of the hinge mechanism sections when the display side housing 110 is in the closed state. FIG. 23 is a cross-sectional view which shows a state of the hinge mechanism sections when the display side housing 110 is in the opened state. FIG. 24 is a perspective view which shows a state of the hinge mechanism sections when the display side housing 110 is in the opened state. FIG. 25 is a perspective view which shows a detailed configuration of the hinge mechanism section 130. FIG. 26 is a perspective view which shows a detailed configuration of the hinge mechanism section 140. FIG. 27 is a figure for describing an operation example of the hinge mechanism section 130. FIG. 28 is a figure for describing an operation example of the hinge mechanism section 140.

As shown in FIG. 22, the hinge mechanism section 130 is included on one end side of the long direction of the main body side housing 120. As shown in FIG. 25, the hinge mechanism section 130 has a rotation shaft 131, a fixing part 132, a cam 133, a cam connection lever 134, a locking hook 135, a hook spring 136, and a variable hinge block 137 which is an example of a torque variation section.

The rotation shaft 131 rotates in accordance with the rotation of the display side housing 110. The fixing part 132 is a portion which rotatably supports the end of the rotation shaft 131, and is fixed to the main body side housing 120. The cam 133 is included in the rotation shaft 131, and forms an approximately semicircular shape. The cam 133 rotates in accordance with the rotation of the rotation shaft 131. The cam connection lever 134 interlockingly rotates with the rotation of the cam 133, in a state in contact with the cam 133.

The locking hook 135 is a locking member capable of shifting between a releasing position (state 301 of FIG. 24 and FIG. 27) and a locking position (state 302 of FIG. 22 and FIG. 27). When the display side housing 110 is positioned in the closed position, the locking hook 135 is positioned in the locking position. The hook spring 136 applies a prescribed energizing force to the locking hook 135, and positions the locking hook 135 in the releasing position. Note that, by pushing the cam connection lever 134 during rotation, the locking hook 135 will be positioned in the locking position with resistance to the energizing force of the locking hook 135.

The variable hinge block 137 allows the rotation torque (called hinge torque) to be changed in accordance with the rotation angle, when the display side housing 110 rotates with respect to the main body side housing 120. In order to change the hinge torque, the variable hinge block 137 has, for example, a variable cam 138 and a plate spring 139. The variable cam 138 rotates in accordance with the rotation of the rotation shaft 131. The variable cam 138 has a concave-convex part 138a, and the rotation position of the concave-convex part 138a changes in accordance with the rotation of the rotation shaft 131. The plate spring 139 applies a compressive force (the direction shown by the arrow in FIG. 25) to the variable cam 138. The compressive force changes in accordance with the rotation position of the concave-convex part 138a. The hinge torque will change due to such a change of the compressive force of the plate spring 139.

As shown in FIG. 22, the hinge mechanism section 140 is included on the other end side of the long direction of the main body side housing 120. As shown in FIG. 26, the hinge mechanism section 140 has a rotation shaft 141, a fixing part 142, a cam 143, a cam connection lever 144, a locking hook 145, a hook spring 146, and a variable hinge block 147. Note that, since the configuration and operation of the rotation shaft 141, the fixing part 142, the cam 143, the cam connection lever 144, the locking hook 145, the hook spring 146 and the variable hinge block 147 are the same as those of the rotation shaft 131, the fixing part 132, the cam 133, the cam connection lever 134, the locking hook 135, the hook spring 136 and a variable hinge block 137 of the hinge mechanism section 130 (refer to FIG. 28), a detailed description will be omitted.

Figure 29:
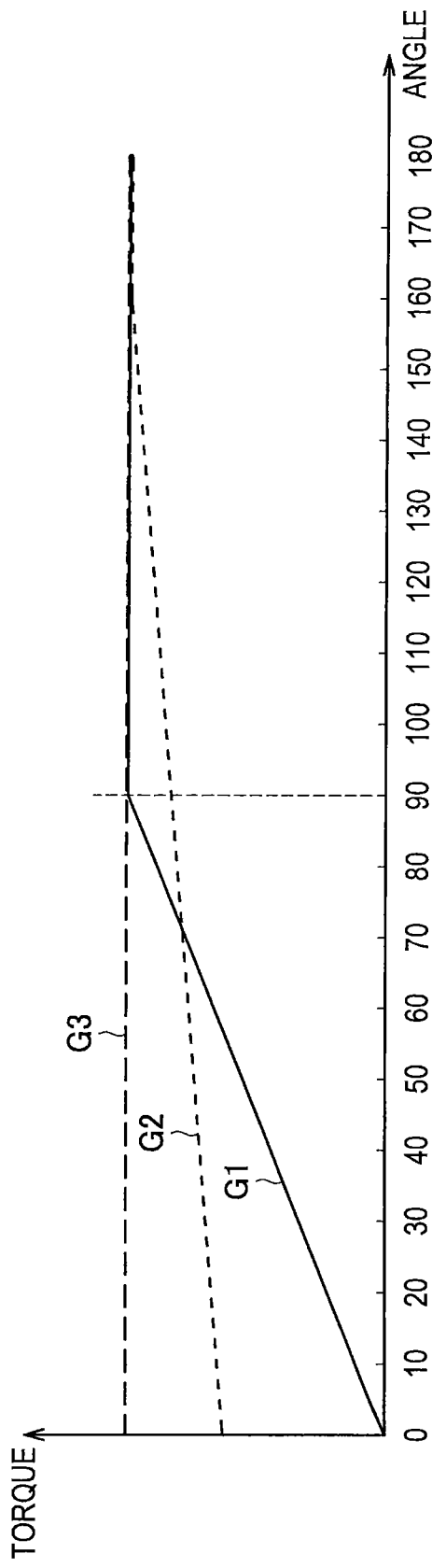
FIG. 29 is a graph which shows a relation between the rotation position of the display side housing 110 and the hinge torque.

Here, a relation between the rotation position of the display side housing 110 and the hinge torque will be described with reference to FIG. 29. FIG. 29 is a graph which shows a relation between the rotation position of the display side housing 110 and the hinge torque. The horizontal axis of the graph is an angle which shows the rotation state of the display side housing 110, and the vertical axis is a size of the torque. For example, in the case where the angle is 0, the display side housing 110 is positioned in the closed state shown in FIG. 3, and in the case where the angle is 90 degrees, the display side housing 110 is positioned in the opened state shown in FIG. 1.

G1 of FIG. 29 shows a change of the hinge torque according to the present embodiment. G2 shows a change of the hinge torque according to a modified example, and G3 shows a comparative example in which the there is no change in the hinge torque. As can be understood from G1, when the display side housing 110 is shifted from the closed state to the opened state, the hinge torque will change. Specifically, the hinge torque increases so as to be proportional to an increase of the rotation angle. Therefore, in the case where the rotation angle of the display side housing 110 is small, the user is allowed to rotate the display side housing 110 with a small force, and in the case where the rotation angle is large, the user is allowed to rotate the display side housing 110 with a large force. Note that, the change in hinge torque may be set so as to become G2 instead of the above described G1.

(1-4. Rotation Operation of the Electronic Apparatus 100 Between the Closed State and the Reversed State)

Figure 30:
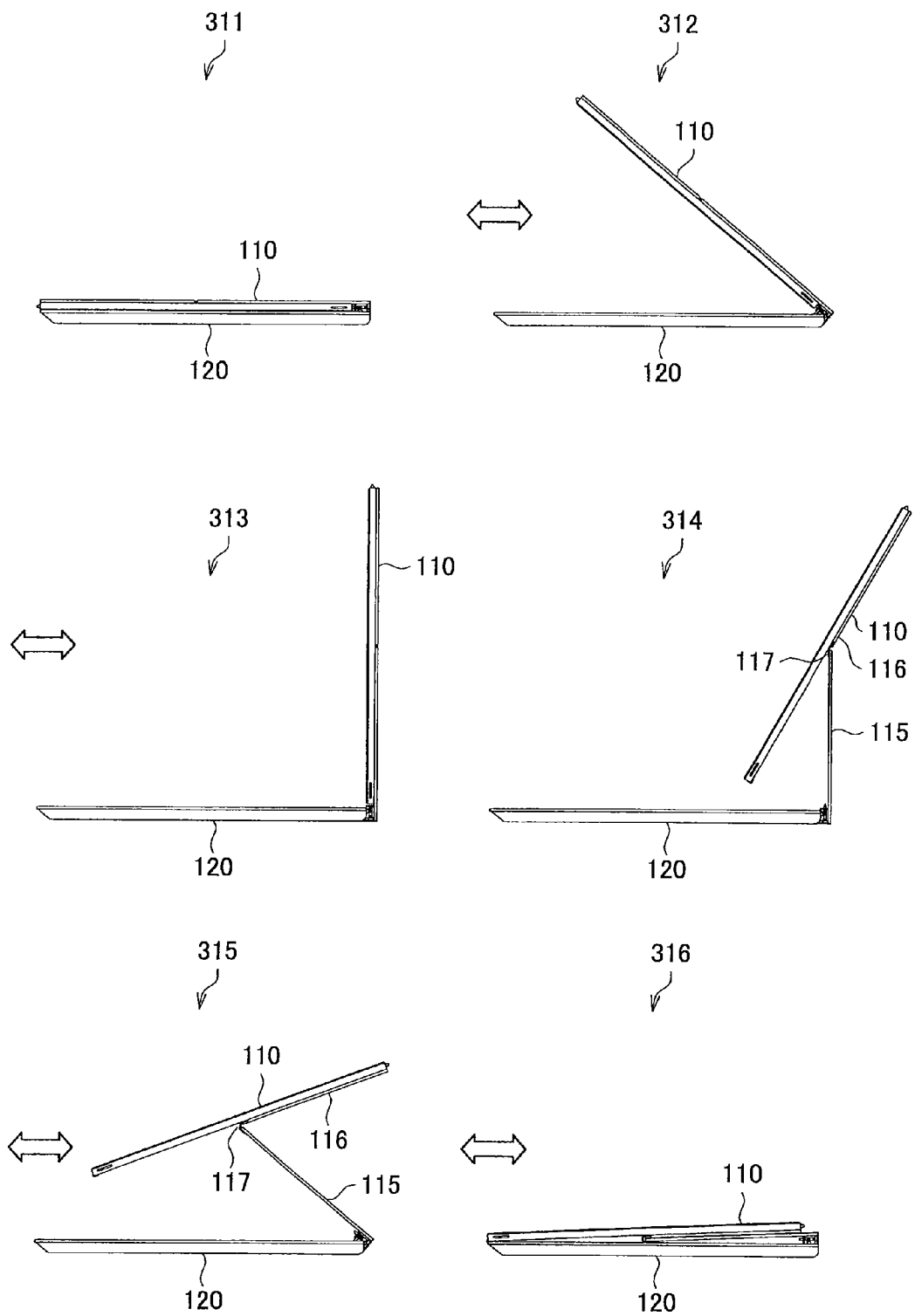
FIG. 30 is a figure for describing the flow of a rotation operation of the electronic apparatus 100 between the closed state and the reversed state.

A rotation operation of the electronic apparatus 100 between the closed state and the reversed state will be described with reference to FIG. 30. FIG. 30 is a figure for describing the flow of a rotation operation of the electronic apparatus 100 between the closed state and the reversed state.

Hereinafter, a rotation operation of the electronic apparatus 100, when the user is allowed to change the electronic apparatus 100 from the closed state to the reversed state, will be described. Here, the display side housing 110 is positioned in the closed state (state 311). Then, the user is allowed to rotate the display side housing 110 clockwise with respect to the main body side housing 120 via the hinge mechanism sections 130 and 140 (state 312), and the electronic apparatus 100 switches over to the opened state (state 313). In this case, the hinge torque changes in accordance with the rotation angle of the display side housing 110 such as described above. Further, the display section 112 maintains a state of being retained on the first support section 115 by the magnets 173a and 173b (FIG. 15) of the first support section 115. Further, the connection bending section 117 is not bent.

Next, the user is allowed to rotate the second support section 116 of the display side housing 100 positioned in the opened state so that the connection bending section 117 bends (state 314). In this case, the display section 112 rotates with resistance to the attractive force by the magnets 173*a* and 173*b*. Note that, since the connection bending section 117 has flexibility, the second support section 116 rotates by bending the connection bending section 117 with the application of a small force. On the other hand, since the hinge torque will be large in the opened state such as described above, the first support section 115 does not rotate, even if a small force is applied.

Afterwards, the user applies a force, so that the first support section 115 of the display side housing 110 rotates in a counter-clockwise direction (state 315), while further bending the connection bending section 117. Afterwards, when the user applies an additional force, the display side housing 110 will transition to the reversed state (state 316).

Note that, when the user changes the electronic apparatus 100 from the reversed state to the closed state, the electronic apparatus 100 performs operations in reverse to the above described rotation operations.

(1-5. Conclusion)

As described above, the display side housing 110, which is rotatably connected to the main body side housing 120 via the hinge mechanism sections 130 and 140, has a support plate 114 which supports the display section 112. Also, the support plate 114 includes a first support section 115 connected to the hinge mechanism section 130, a second support section 116 which supports the display section 112, and a connection bending section 117 which has a flexibility to rotatably connect the second support section 116 with respect to the first support section 115.

According to such a configuration, the display side housing 110 can be allowed to rotate in a plurality of rotation states, via the hinge mechanism sections 130 and 140 and the connection bending section 117. Further, since the connection bending section 117 has a simple configuration which is different to the hinge mechanism sections 130 and 140, and has a thickness which can be reduced, an increase in the thickness of the display side housing 110 can be suppressed.

Further, since the connection bending section 117 easily bends with a small force when compared to the hinge mechanism sections 130 and 140, the connection bending section 117 can rotate the second support section 116, which fixedly supports the display section 112, in a state in which the first support section 115 stops in the opened state. In this way, a user can be allowed to easily rotate the display section 112 in a desired rotation state, without worrying about the rotation of the first support section 115.

In addition, since the thickness of the first support section 115 and the second support section 116 can be made the same, by having the connection bending section 117 connect the first support section 115 and the second support section 116, the support plate 114 can be made as a flat top plate.

2. The Second Embodiment (2-1. External Appearance Configuration of the Information Processing Apparatus)

Hereinafter, a description will be made by including an electronic apparatus 200 shown in FIG. 31 as an example of the information processing apparatus according to the present disclosure. Since the configuration of the electronic apparatus 200 according to the second embodiment is similar to that of the electronic apparatus 100 shown in FIG. 1, hereinafter, the characteristic configuration or the like of the electronic apparatus 200 will be described.

Figure 31:
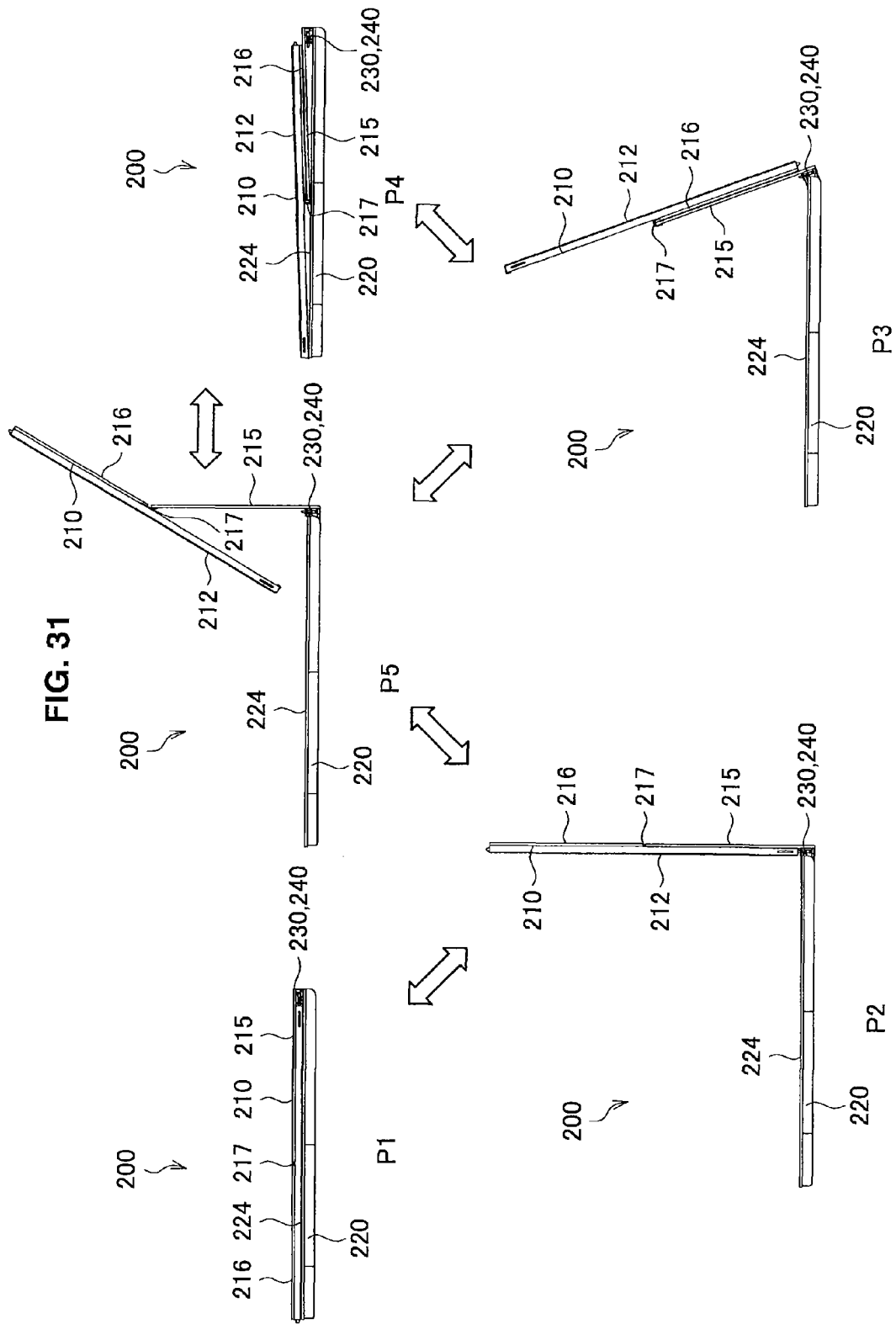
FIG. 31 is a figure which shows a transition example between five postures of an electronic apparatus 200 according to a second embodiment of the present disclosure.

FIG. 31 is a figure which shows a transition example between the five postures of the electronic apparatus 200 according to the second embodiment. A display side housing 210 of the electronic apparatus 200 has a display section 212 which displays information, and which rotates with respect to a main body side housing 220 via hinge mechanism sections 230 and 240 which are connection sections. Further, also in the second embodiment, the display side housing 210 has a first support section 215 connected to the hinge mechanism sections 230 and 240, a second support section 216 which supports the display section 212, and a connection bending section 217 which connects the first support section 215 and the second support section 216.

The display section 212 is reversed by rotating the second support section 216 with respect to the first support section 215 (that is, the connection bending section 217 is bent). Here, the position prior to the display section 212 being reversed (the state of a first posture P1 and a second posture P2 of FIG. 31) will be called a first position, and the position to which the display section 212 is reversed (the state of a third posture P3 and a fourth posture P4 of FIG. 31) will be called a second position. Also, as shown in FIG. 31, the display side housing 210 of the above described configuration transitions between a first posture P1, a second posture P2, a third posture P3, a fourth posture P4 and a fifth posture P5.

The first posture P1 is a posture in which the display side housing 210 is closed with respect to the main body side housing 220, so that the display section 212 positioned in the first position faces a main surface 224 of the main body side housing 220. For example, when the display side housing 210 is positioned in the first posture P1, the electronic apparatus 200 is not used, or the electronic apparatus 200 is carried by a user. In the case of the first posture P1, the screen of the display section 212 is turned OFF, or the system enters a standby state, in order to reduce power consumption.

The second posture P2 is a posture in which the display side housing 210 is opened with respect to the main body side housing 220, in a state in which the display section 212 is positioned in the first position. For example, when the display side housing 210 is positioned in the second posture P2, the user performs input operations by an input section 222 while viewing information displayed on the display section 212. In the case of the second posture P2, the screen of the display section 212 is turned ON, and the screen is fixed to a forward direction.

The third posture P3 is a posture in which the display side housing 210 is opened with respect to the main body side housing 220, in a state in which the display section 212 is positioned in the second position. For example, when the display side housing 210 is positioned in the third posture P3, the user can view videos or listen to music on the display section 212 which is reversed. In this case, natural sounds can be heard by allowing the left-right output of a pair of speakers, which are an audio output section, to be reversed. In the case of the third posture P3, the screen of the display section 212 is fixed to a reverse direction, and the left-right output of the speakers are reversed.

The fourth posture P4 is a posture in which the display side housing 210 is closed with respect to the main body side housing 220, so that a portion of the opposite side of the display section 212 positioned in the second position faces the main surface 224 of the main body side housing 220. When the display side housing 210 is positioned in the fourth posture P4, the user uses the electronic apparatus 200 as a so-called tablet. Therefore, there are cases where the user uses the electronic apparatus 200 while the electronic apparatus 200 is allowed to freely rotate vertically and horizontally. In the case of the fourth posture, the screen of the display section 212 is allowed to rotate in accordance with a detected orientation of an acceleration sensor. Further, the left-right output of the speakers is controlled in accordance with the orientation of the screen.

The fifth posture P5 is a posture in which the display side housing 210 is in a state of rotating between the third posture P3 and the fourth posture P4. That is, the fifth posture P5 is a posture in a transition state between the third posture P3 and the fourth posture P4. In the case of the fifth posture P5, the functions of the input section 222 (keyboard or touch pad) are disabled, in order to prevent incorrect operations of the keyboard or touch pad at the time of transition.

Three magnets and three detection sensors are included in the electronic apparatus 200 of the second embodiment, in order to detect the first posture P1, the second posture P2, the third posture P3, the fourth posture P4 and the fifth posture P5. The three magnets are included in at least one of the display side housing 110 and the main body side housing 120, and generate magnetic fields. The three detection sensors are included corresponding to each of the three magnets, and detect the magnetic fields generated by the magnets. Specifically, as shown in FIG. 32 to FIG. 36, three magnets 251, 252 and 253 and three detection sensors 261, 262 and 263 are included. The magnets 251, 252 and 253 and the detection sensors 261, 262 and 263 constitute a posture detection section which detects the posture of the electronic apparatus 200.

Figure 32:
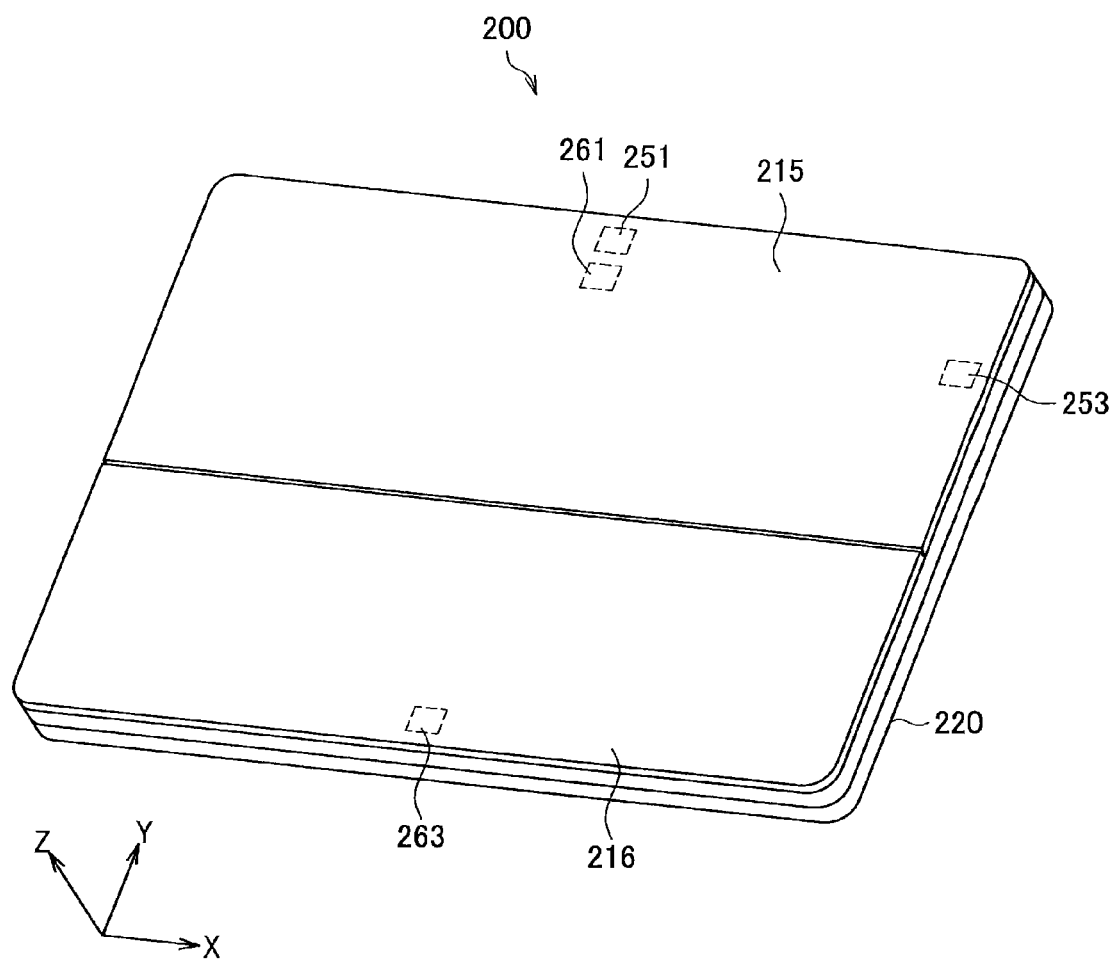
FIG. 32 is a perspective view which shows a relation between magnets and detection sensors when the electronic apparatus 200 is positioned in a first posture P1.
Figure 33:
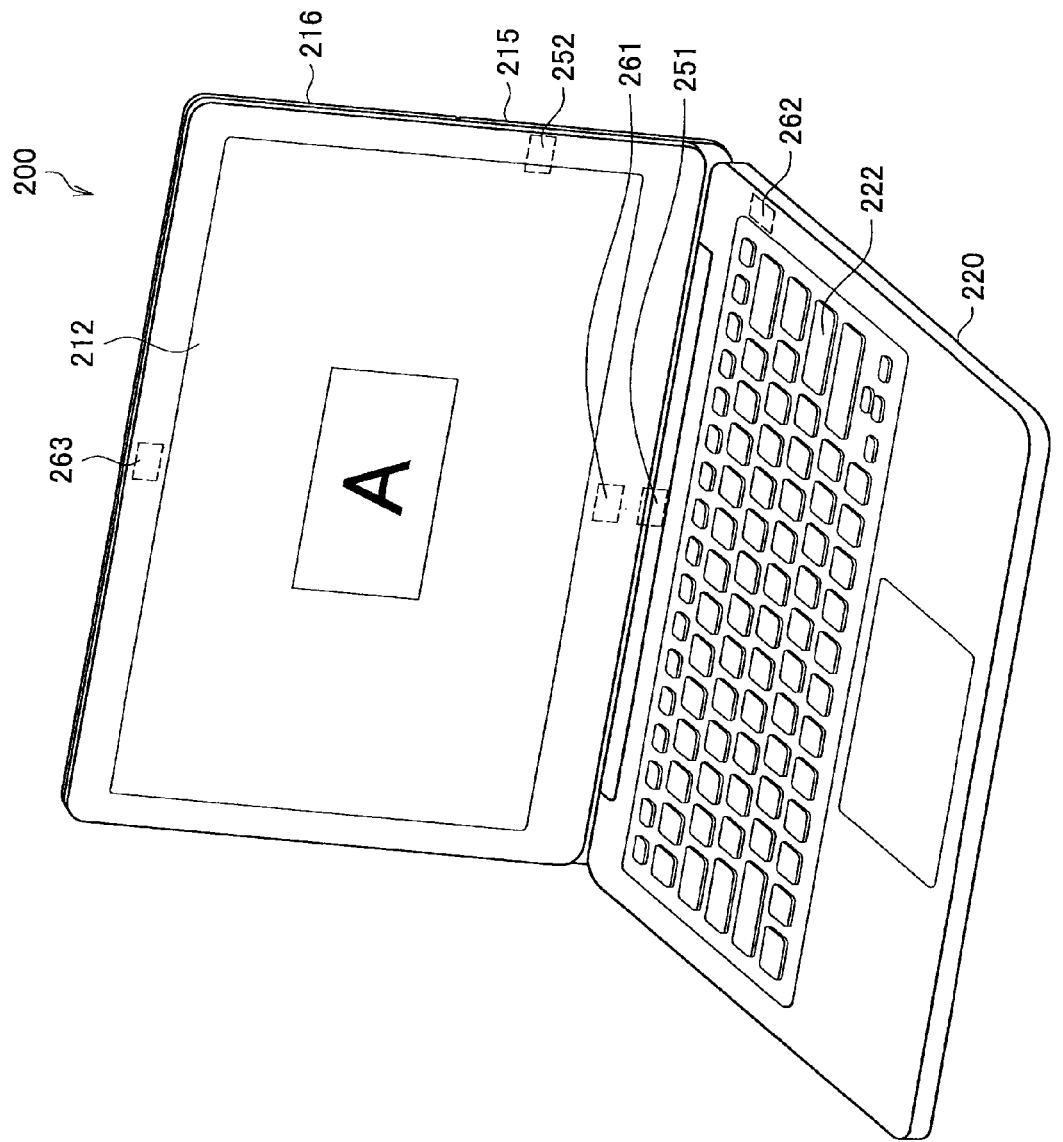
FIG. 33 is a perspective view which shows a relation between magnets and detection sensors when the electronic apparatus 200 is positioned in a second posture P2.
Figure 34:
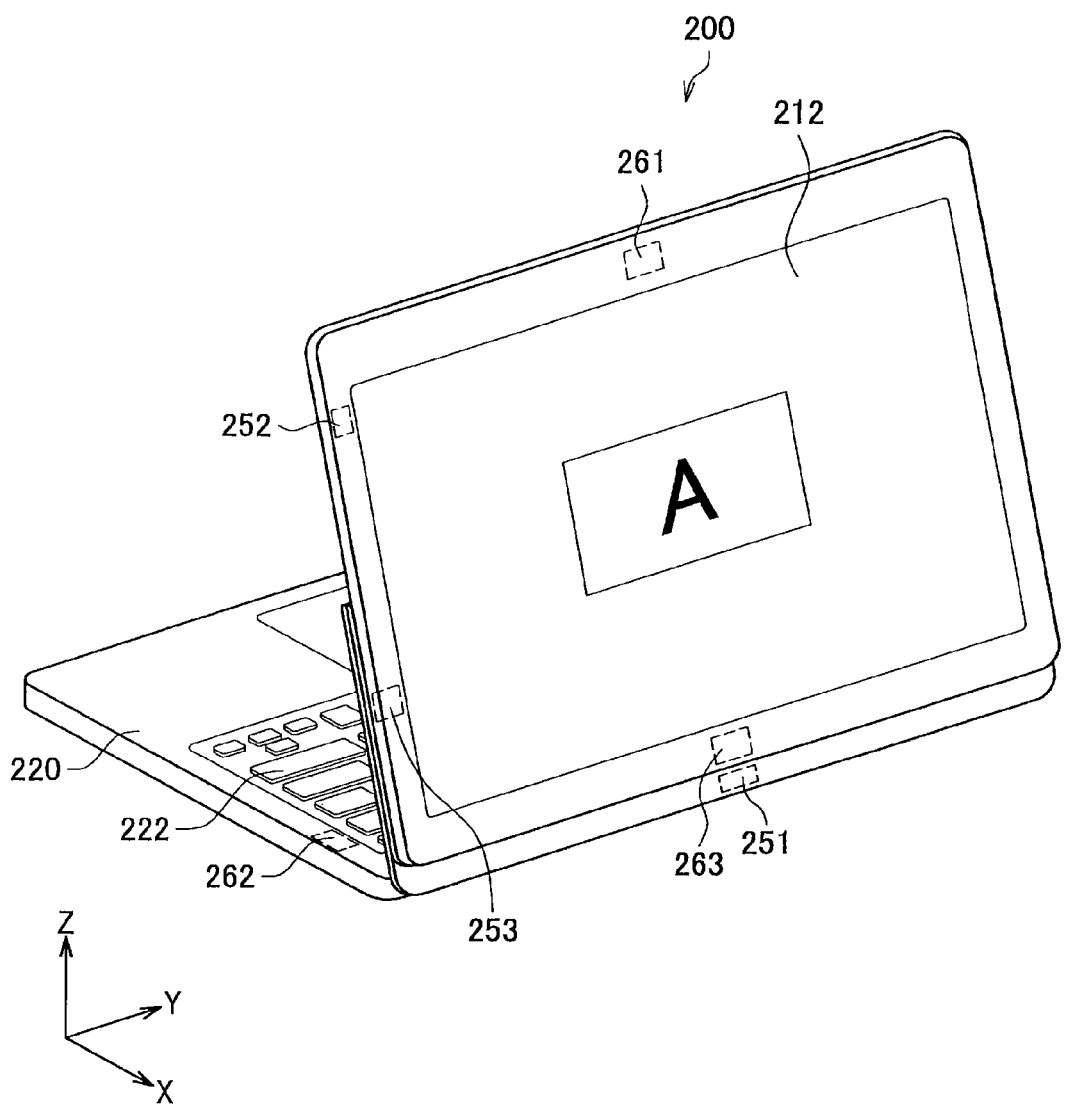
FIG. 34 is a perspective view which shows a relation between magnets and detection sensors when the electronic apparatus 200 is positioned in a third posture P3.
Figure 35:
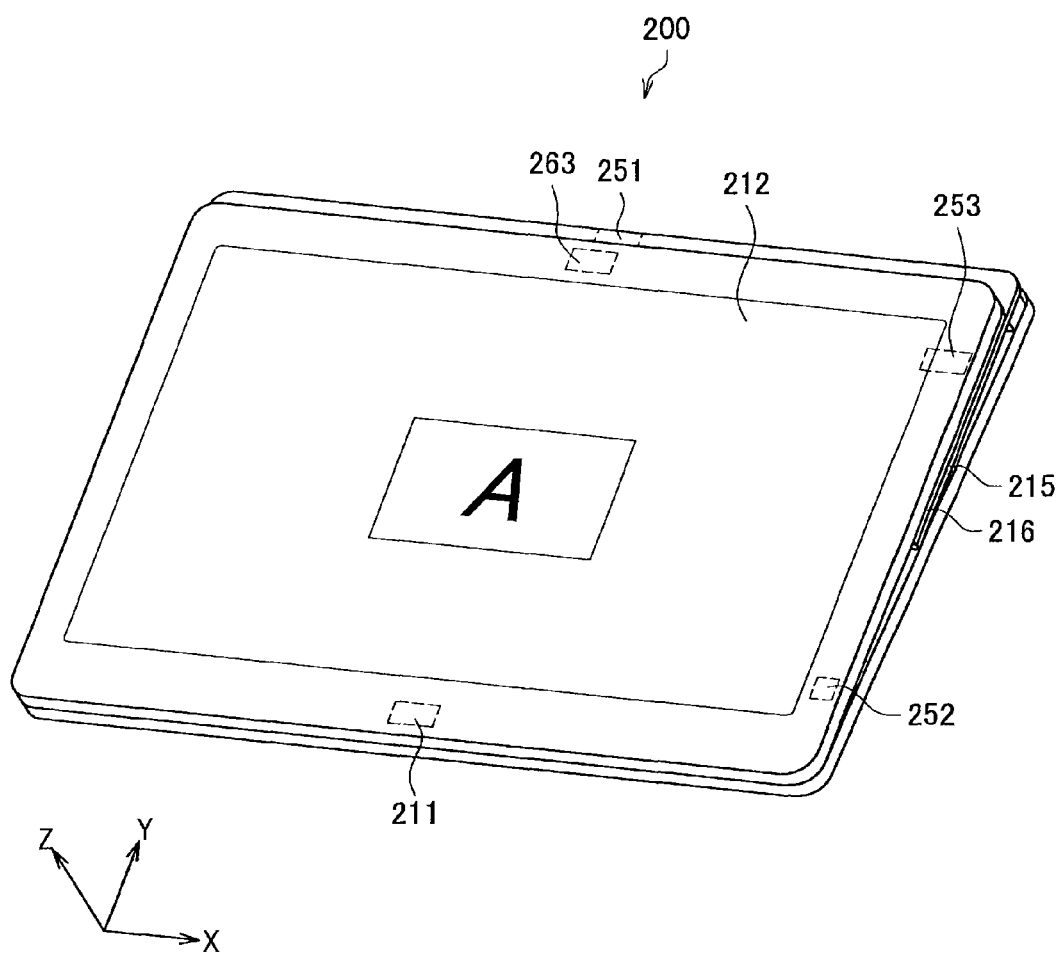
FIG. 35 is a perspective view which shows a relation between magnets and detection sensors when the electronic apparatus 200 is positioned in a fourth posture P4.
Figure 36:
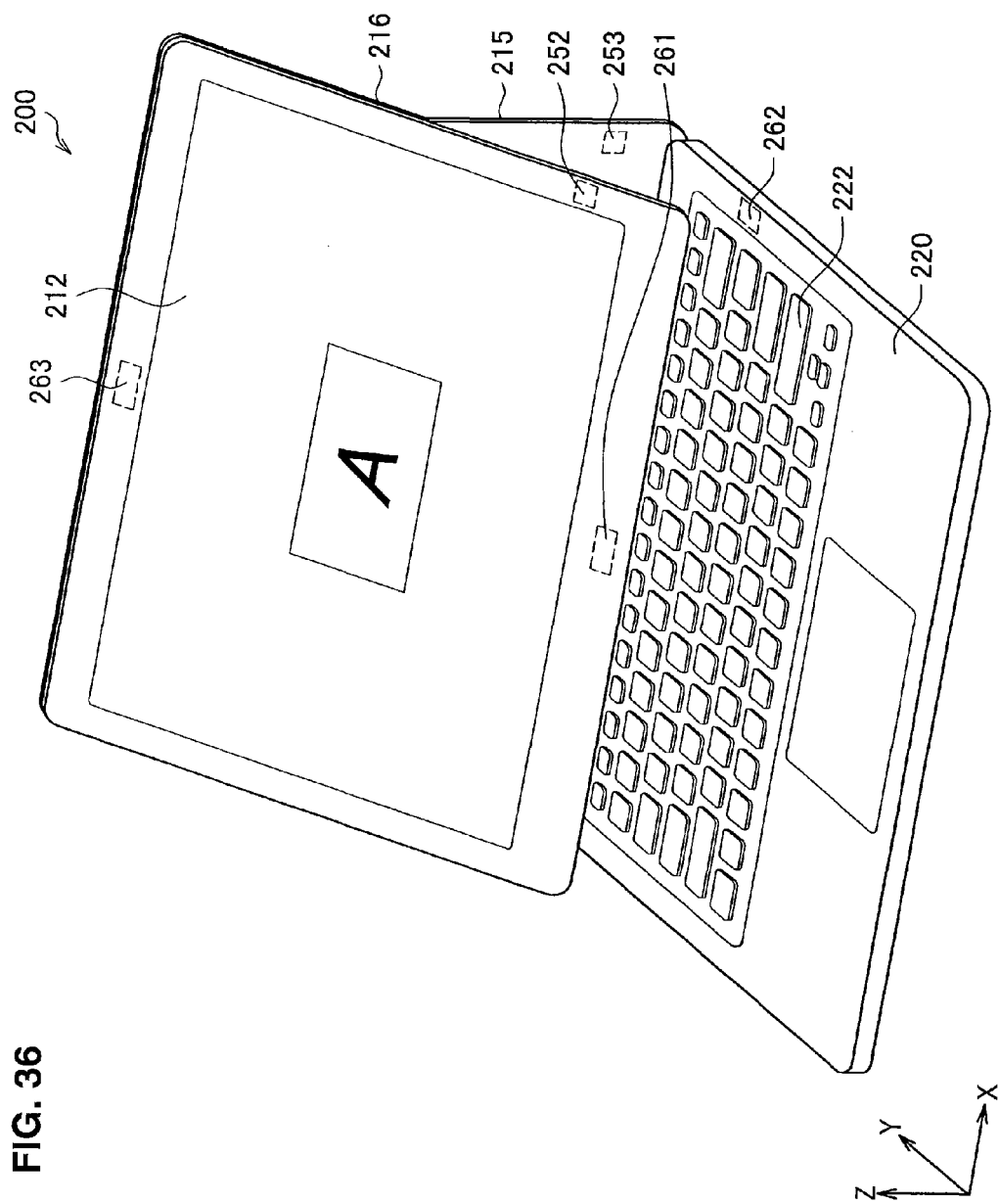
FIG. 36 is a perspective view which shows a relation between magnets and detection sensors when the electronic apparatus 200 is positioned in a fifth posture P5.

FIG. 32 is a perspective view which shows a relation between the magnets and the detection sensors when the electronic apparatus 200 is positioned in the first posture P1. FIG. 33 is a perspective view which shows a relation between the magnets and the detection sensors when the electronic apparatus 200 is positioned in the second posture P2. FIG. 34 is a perspective view which shows a relation between the magnets and the detection sensors when the electronic apparatus 200 is positioned in the third posture P3. FIG. 35 is a perspective view which shows a relation between the magnets and the detection sensors when the electronic apparatus 200 is positioned in the fourth posture P4. FIG. 36 is a perspective view which shows a relation between the magnets and the detection sensors when the electronic apparatus 200 is positioned in the fifth posture P5.

As shown in FIG. 33, the first detection sensor 261 is included on one end side of the short direction (the Y direction shown in FIG. 33) of the display section 212. When the display section 212 rotating between the first position (the position shown in FIG. 32) and the second position (the position shown in FIG. 33) is positioned in the first position, the first detection sensor 261 outputs ON by approaching the first magnet 251 included in the first support section 215. For example, when the first detection sensor 261 detects the magnetic field generated by the first magnet 251, the first detection sensor 261 outputs ON. In the second embodiment, the first detection sensor 261 outputs ON when the electronic apparatus 200 is positioned in the first posture P1 or the second posture P2, and outputs OFF when the electronic apparatus 200 is positioned in the third posture P3, the fourth posture P4 or the fifth posture P5.

As shown in FIG. 33, the second detection sensor 262 is included on one end side of the long direction (the X direction shown in FIG. 33) of the main body side housing 220. The second detection sensor 262 outputs ON when approached by the second magnet 252 included in the display section 212 or the third magnet 253 included in the first support section 215. In the second embodiment, the second detection sensor 262 outputs ON when the electronic apparatus 200 is positioned in the first posture P1 or the fourth posture P4, and outputs OFF when the electronic apparatus 200 is positioned in the second posture P2, the third posture P3 or the fifth posture P5.

As shown in FIG. 33, the third detection sensor 263 is included on the other end side of the short direction (the Y direction shown in FIG. 33) of the display section 212. When the display section 212 rotating between the first position and the second position is positioned in the second position, the third detection sensor 261 outputs ON by approaching the first magnet 251 included in the first support section 215 (FIG. 34). In the second embodiment, the third detection sensor 263 outputs ON when the electronic apparatus 200 is positioned in the third posture P3 or the fourth posture P4, and outputs OFF when the electronic apparatus 200 is positioned in the first posture P1, the second posture P2 or the fifth posture P5.

Note that, the arrangement of the first detection sensor 261, the second detection sensor 262 and the third detection sensor 263 may be easily determined by the detection distance of each posture, the distance from the rotation axis at the time when performing posture transition, the strength of the magnets 251, 252 and 253, or the sensitivity of the detection sensors. However, in the case where the magnets which are generally used or the sensitivity of the detection sensors are considered, it is desirable for the arrangement of the three sensors 261, 262 and 263 to be at the positions shown in FIG. 32 to FIG. 36.

Figures 37, 38:
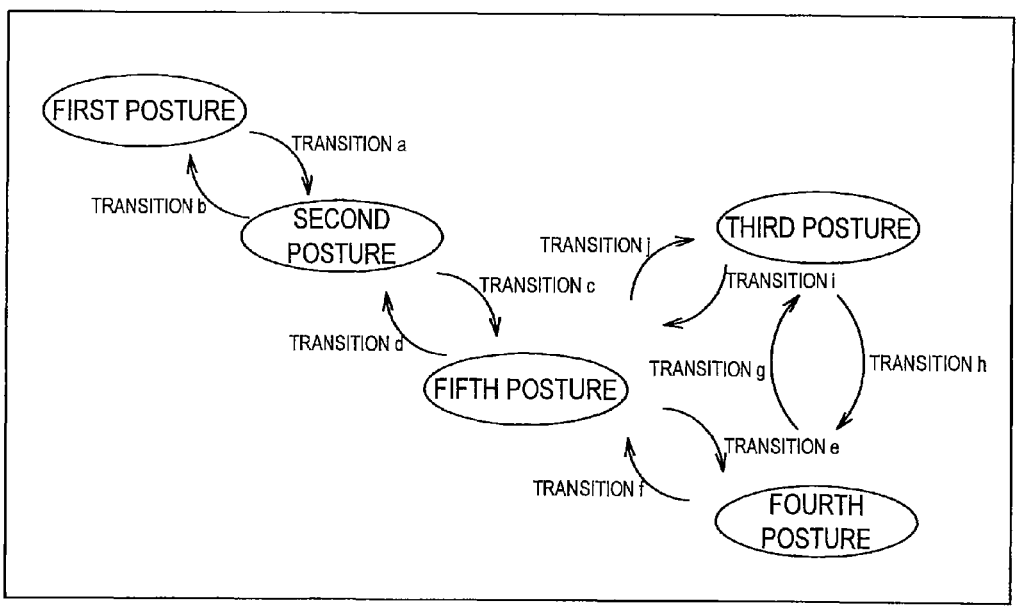
FIG. 37 is a table which shows a relation between the detection results of three detection sensors 261 to 263 and the five postures P1 to P5 of the electronic apparatus 200.
FIG. 38 is a schematic diagram for describing a transition a to a transition j between the five postures P1 to P5.

In the second embodiment, as shown in FIG. 37, the electronic apparatus 200 performs detection by combining the detection results of the first detection sensor 261, the second detection sensor 262 and the third detection sensor 263. In this way, the electronic apparatus 200 can accurately detect any of the first posture P1, the second posture P2, the third posture P3, the fourth posture P4 and the fifth posture P5.

FIG. 37 is a table T1 which shows a relation between the detection results of the three detection sensors 261 to 263 and the five postures P1 to P5 of the electronic apparatus 200. As shown in FIG. 37, in the case where the first detection sensor 261 and the second detection sensor 262 are ON, the first posture P1 is detected. In the case where the first detection sensor 261 is ON and the second detection sensor 262 is OFF, the second posture P2 is detected. In the case where the first detection sensor 261 and the second detection sensor 262 are OFF and the third detection sensor 263 is ON, the third posture P3 is detected. In the case where the first detection sensor 261 is OFF and the second detection sensor 262 and the third detection sensor 263 are ON, the fourth posture P4 is detected. In the case where the first detection sensor 261, the second detection sensor 262 and the third detection sensor 263 are OFF, the fifth posture P5 is detected.

FIG. 38 is a schematic diagram for describing a transition a to a transition j between the five postures P1 to P5. In the second embodiment, the transitions between the five postures P1 to P5 of the electronic apparatus 200 are output in accordance with a change of the output (ON, OFF) of the three detection sensors 261, 262 and 263.

That is, transition a from the first posture P1 to the second posture P2 is detected when the output of the second detection sensor 262 is switched from ON to OFF, and transition b from the second posture P2 to the first posture P1 is detected when the output of the second detection sensor 262 is switched from OFF to ON. Transition c from the second posture P2 to the fifth posture P5 is detected when the output of the first detection sensor 261 is switched from ON to OFF, and transition d from the fifth posture P5 to the second posture P2 is detected when the output of the first detection sensor 261 is switched from OFF to ON. Transition e from the fifth posture P5 to the fourth posture P4 is detected when the outputs of the second detection sensor 262 and the third detection sensor 263 are switched from OFF to ON, and transition f from the fourth posture P4 to the fifth posture P5 is detected when the outputs of the second detection sensor 262 and the third detection sensor 263 are switched from ON to OFF.

Further, transition g from the fourth posture P4 to the third posture P3 is detected when the output of the second detection sensor 262 is switched from ON to OFF, and transition h from the third posture P3 to the fourth posture P4 is detected when the output of the second detection sensor 262 is switched from OFF to ON. Transition i from the third posture P3 to the fifth posture P5 is detected when the output of the third detection sensor 263 is switched from ON to OFF, and transition j from the fifth posture P5 to the third posture P3 is detected when the output of the third detection sensor 263 is switched from OFF to ON.

Figure 39:
FIG. 39 is a table which shows a relation between the detection results of two detection sensors 262 and 263 and the four postures P1 to P4 of the electronic apparatus 200.

Note that, the above described five postures P1 to P5 of the electronic apparatus 200 are detected by using the three detection sensors 261 to 263. However, the present disclosure is not limited to this, and the four postures P1 to P4 of the electronic apparatus 200 may be detected by using the two detection sensors 262 and 263, for example, such as shown in FIG. 39. In such a case, the posture of the electronic apparatus 200 is detected by combining the detection results of the two detection sensors 262 and 263. In this way, the electronic apparatus 200 can accurately detect any of the first posture P1, the second posture P2, the third posture P3 and the fourth posture P4.

FIG. 39 is a table T2 which shows a relation between the detection results of the two detection sensors 262 and 263 and the four postures P1 to P4 of the electronic apparatus 200. As shown in FIG. 39, in the case where the second detection sensor 262 is ON and the third detection sensor 263 is OFF, the first posture P1 is detected. In the case where the second detection sensor 262 and the third detection sensor 263 are OFF, the second posture P2 is detected. In the case where the second detection sensor 262 is OFF and the third detection sensor 263 is ON, the third posture P3 is detected. In the case where the second detection sensor 262 and the third detection sensor 263 are ON, the fourth posture P4 is detected.

(2-2. Functional Configuration of the Information Processing Apparatus)

A functional configuration of the electronic apparatus 200 according to the second embodiment will be described with reference to FIG. 40.

Figure 40:
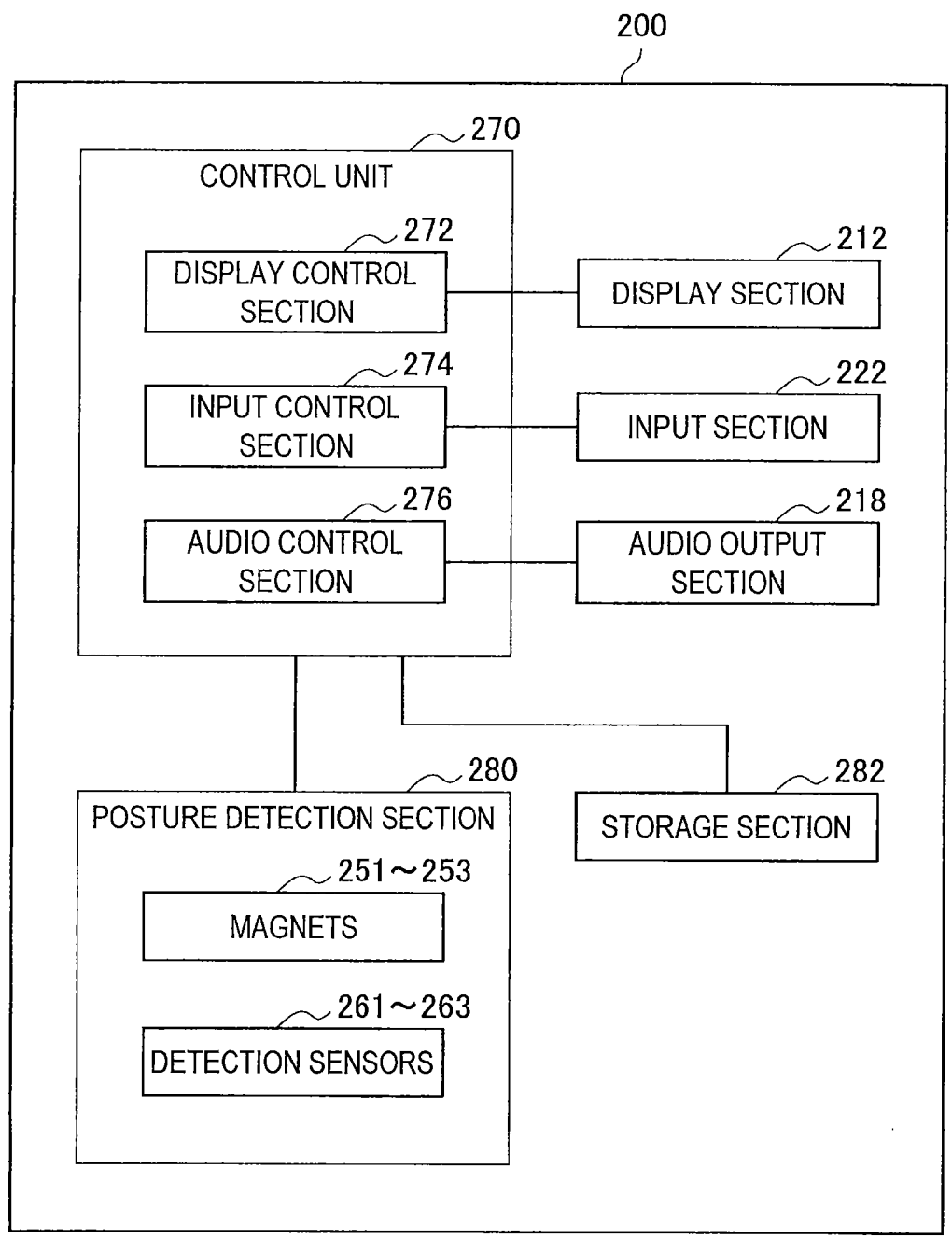
FIG. 40 is a block diagram which shows an example of a functional configuration of the electronic apparatus 200 according to the second embodiment.

FIG. 40 is a block diagram which shows an example of a functional configuration of the electronic apparatus 200 according to the second embodiment. As shown in FIG. 40, the electronic apparatus 200 according to the second embodiment has a control unit 270 which is an example of a control apparatus, a posture detection section 280, and a storage section 282.

The control unit 270 is a processor which controls all the operations of the electronic apparatus 200. The control unit 270 has a display control section 272, an input control section 274, and an audio control section 276.

The display control section 272 controls the display state of the display section 212 in accordance with the detection result of the posture detection section 280. For example, the display control section 272 controls a display orientation as the display state of the display section 212. Specifically, in the case where the electronic apparatus 200 is in posture P1, the display control section 272 fixedly displays the display orientation of the display section 212 in the orientation shown in FIG. 33 (forward direction), and in the case where the electronic apparatus 200 is in the third posture P3, the control section 272 fixedly displays the display orientation of the display section 212 in the orientation shown in FIG. 34 (reverse direction). In this way, a display of the display section 212 can be performed which conforms to the user cases of the electronic apparatus 200.

The input control section 274 controls the input function of the input section 222 in accordance with the detection result of the posture detection section 280. For example, in the case where the electronic apparatus 200 is in the first posture P1, the input control section 274 enables the input function for the input section 222, and in the case where the electronic apparatus 200 is in the fifth posture P5, which is shifting between postures of the electronic apparatus 200, the input control section 274 disables the input function of the input section 222 (a keyboard or touch pad). In this way, incorrect input of the input section 222 can be prevented during shifting between postures.

The audio control section 276 controls the input function of the audio output section 218 in accordance with the detection result of the posture detection section 280. The audio output section 218 is a pair of speakers, for example, and is included as a left-right pair of speakers for the display section 212 of the display side housing 210. For example, the left-right audio output is reversed for the case where the electronic apparatus 200 is in the third posture P3, in contrast to the left-right audio output of the audio output section 218 for the case where the electronic apparatus 200 is in the first posture P1. In this way, natural sounds can be output, even if the posture of the electronic apparatus 200 changes.

The posture detection section 280 detects which of the first posture P1, the second posture P2, the third posture P3, the fourth posture P4 and the fifth posture P5 is the posture of the electronic apparatus 200. The posture detection section 280 has the above described magnets 251 to 253 and detection sensors 261 to 263. The posture detection section 280 detects the posture of the electronic apparatus 200 by combining the detection results of the three detection sensors 261 to 263.

The storage section 282 stores various programs or data processed by the control unit 270. The storage section 282 may store the detection result of the posture detection section 280.

Note that, there will be cases where the user makes the electronic apparatus 200 shift from the fifth posture P5 to the fourth posture P4, and there will be cases where the user makes the electronic apparatus 200 shift from the fifth posture P5 to the fourth posture P4 via the third posture P3. Accordingly, in the second embodiment, the control unit 270 includes a delay time, that is, before determining the posture from when a transition shift from the fifth posture P5 to the third posture P3 is detected. In this way, the fourth posture P4 can be appropriately detected, even if the user makes the electronic apparatus 200 shift from the fifth posture P5 to the fourth posture P4.

Further, the control unit 270 may limit the processes capable of being executed in the case where the posture detection section 280 detects the fourth posture P4 more than the processes capable of being executed in the case where the posture detection section 280 detects the other postures P1, P2, P3 and P5. Since the main body side housing 220 is covered by the display side housing 210 in the case of the fourth posture P4, it will be unfavorable for dissipating heat. Accordingly, the problem of heat dissipation can be eliminated by having the control unit 270 limit the processes (suppress the power consumption) capable of being executed in the case of the fourth posture P4.

(2-3. Operation Example)

A process example of display control corresponding to the posture detection of the electronic apparatus 200 will be described with reference to FIG. 41. The process shown in FIG. 41 is implemented by having a CPU of the electronic apparatus 200 execute a program stored in a ROM. The executed program may be stored on a recordable medium such as a CD (Compact Disk), DVD (Digital Versatile Disk), memory card or the like, or may be downloaded from a server or the like via the internet.

FIG. 41 is a flow chart which shows a process example of display control corresponding to the posture detection of the electronic apparatus 200. The flow chart of FIG. 41 starts from when the posture detection section 280 detects the posture of the electronic apparatus 200 in accordance with the rotation of the display side housing 210 (step S102).

Next, the control unit 270 judges whether or not the detected posture is the third posture P3 transitioned from the fifth posture P5 (step S104). In the case where the posture detected in step S104 is a posture other than the third posture P3 transitioned from the fifth posture P5 (specifically, the fourth posture P4) (No), the control unit 270 determines the detected posture (step S106). Next, the control unit 270 performs display control corresponding to the determined posture (step S112).

On the other hand, in the case where the posture detected in step S104 is the third posture P3 transitioned from the fifth posture P5 (Yes), the control unit 270 judges whether or not another posture is detected within a prescribed time from the detection of the third posture P3 (step S108). In the case where another posture is not detected within the prescribed time in step S108 (No), the control unit 270 determines the posture of the electronic apparatus 200 to be the third posture P3 (step S106), and display control is performed corresponding to the third posture P3 (step S112).

In the case where another posture (specifically, the fourth posture P4) is detected within the prescribed time in step S108 (Yes), the control unit 270 determines the other detected posture (the fourth posture P4) (step S110). Next, the control unit 270 performs display control corresponding to the determined posture (step S112).

(2-4. Rotation Control of the Screen of the Display Section)

Next, rotation control of the screen of the display section 212 according to the second embodiment will be described.

As described above, when the electronic apparatus 200 is positioned in the second posture P2, the screen of the display section 212 is fixed to the forward direction (FIG. 33), and when the electronic apparatus 200 is positioned in the third posture P3, the screen of the display section 212 is fixed to the reverse direction (FIG. 34). On the other hand, since a user is allowed to freely rotate the electronic apparatus 200 vertically and horizontally as a tablet when the electronic apparatus 200 is positioned in the fourth posture P4, it is possible for the screen of the display section 212 to be made to automatically rotate in accordance with the inclination of the electronic apparatus 200.

Incidentally, in the electronic apparatus 200, the user can switch the setting for automatic rotation of the screen ON or OFF in accordance with the inclination of the electronic apparatus 200 in the fourth posture P4. For example, in the case where the setting for automatic rotation of the screen has been previously turned OFF when in the fourth posture P4, the display control section 272 allows the current orientation of the screen in the fourth posture P4 to be fixed. Note that, a fixed orientation of the screen is the orientation of the screen at the time when automatic rotation has been set to OFF. On the other hand, in the case where the setting for automatic rotation has been previously turned ON, the display control section 272 automatically rotates the screen in the fourth posture P4 in accordance with the current inclination of the electronic apparatus 200. In this way, when the electronic apparatus 200 is in the fourth posture P4, an orientation of the screen can be displayed which reflects the intentions of the user.

Further, the storage section 282 of the electronic apparatus 200 (FIG. 40) stores the orientation (display orientation) of the screen of the display section 212 when in the fourth posture P4. Further, the storage section 282 stores the above described setting for automatic rotation of the screen, or the orientation of the screen when automatic rotation is set to OFF. For example, the storage section 282 may store the setting for automatic rotation of the screen, or the orientation of the screen when automatic rotation is set to OFF, every time the electronic apparatus 200 transitions to the fourth posture P4. Also, the display control section 272 allows a display on the display section 212 with the orientation of the screen stored in the storage section 282, when transiting to the fourth posture P4. In this way, a display can be performed with an orientation of the screen the user wants to view, even if the electronic apparatus 200 transits to the fourth posture P4.

Note that, after the electronic apparatus 200 transits to the fourth posture P4, the following control may be performed, in order to prevent a return to the orientation of the screen stored in the storage section 282 by an incorrect operation from the user. That is, the orientation of the screen may be retained during a display by the display section 212, up until the user intends to change the orientation of the screen. In this way, a rotation of the screen not intended by the user can be prevented.

(2-5. Conclusion)

As described above, the posture detection section 280 detects the posture of any of the first posture P1 to the fourth posture P4. Also, the display control section 272 controls the display form of the display section 212 in accordance with the detected posture of the electronic apparatus 200.

According to such a configuration, for example, the orientation of the screen of the display section 212 can be switched, and the screen can be switched ON/OFF, in accordance with the detected posture of the electronic apparatus 200. Specifically, the screen is fixed to the forward direction in the second posture P2, and the screen is fixed to the reverse direction in the third posture P3. In this way, since a display of the display section 212 can be performed which conforms to the user cases of the electronic apparatus 200, the usability of the electronic apparatus 200 is improved.

It should be understood by those skilled in the art that various modifications, combinations, sub-combinations and alterations may occur depending on design requirements and other factors insofar as they are within the scope of the appended claims or the equivalents thereof.

While the a description has been made above in which a notebook personal computer is included as an example of the above described electronic apparatus, the electronic apparatus is not limited to this. For example, the electronic apparatus may be a game machine, an electronic dictionary or the like which has a housing capable of rotating via connection sections.

Further, while the steps shown in the flow charts of the above described embodiments may of course be processed in chronological order in accordance with the described order, they may not necessarily be processed in chronological order, and may be processed individually or in a parallel manner. It is needless to say that, in the case where the steps are processed in chronological order, the order of the steps may be changed appropriately according to the circumstances.

The processes by the information processing apparatus described in the present disclosure may be implemented by using any of the combinations of software, hardware, or software and hardware. Programs constituting the software are stored, for example, in advance in a storage medium installed inside or outside of each apparatus. Also, each program is read, for example, to a RAM (Random Access Memory) when executed, and is executed by a processor such as a CPU.

Further, the effect described in the present disclosure is not limited to only that described or illustrated. That is, the technology according to the present disclosure accomplishes other effects which are clear to a person skilled in the art from the description of the present disclosure, along with the above described effect or instead of the above described effect.

Additionally, the present technology may also be configured as below.

(1) An information processing apparatus, including:
   a first housing;
   a second housing, having a display section which displays information, in which the display section is reversed between a first position and a second position;
   a connection section which rotatably connects the second housing with respect to the first housing;
   a posture detection section which detects any of the four postures of
      a first posture in which the second housing is closed with respect to the first housing so that the display section positioned in the first position faces a main surface of the first housing,
      a second posture in which the second housing is opened with respect to the first housing in a state in which the display section is positioned in the first position,
      a third posture in which the second housing is opened with respect to the first housing in a state in which the display section is positioned in the second position, and
      a fourth posture in which the second housing is closed with respect to the first housing so that a portion of an opposite side of the display section positioned in the second position faces the main surface of the first housing; and
   a display control section which controls a display state of the display section in accordance with a detection result of the posture detection section.

(2) The information processing apparatus according to (1), further including:
   an input section provided in at least one of the first housing and the second housing; and
   an input control section which controls an input function of the input section in accordance with a detection result of the posture detection section.

(3) The information processing apparatus according to (1) or (2), further including:
   a control apparatus which controls the information processing apparatus,
   wherein the control apparatus limits the control of the information processing apparatus in the case where the posture detection section detects the fourth posture more than the control of the information processing apparatus in the case where the posture detection section detects the first posture, the second posture or the third posture.

(4) The information processing apparatus according to any one of (1) to (3),
   wherein the posture detection section further detects a fifth posture in which the second housing is in a state of rotating between the third posture and the fourth posture.

(5) The information processing apparatus according to (4),
   wherein the posture detection section has a delay time before determining a posture from when a transition shift from the fifth posture to the third posture is detected.

(6) The information processing apparatus according to any one of (1) to (5),
   wherein the posture detection section includes
      two magnets, provided in at least one of the first housing and the second housing, which generate magnetic fields; and
      two detection sensors, provided corresponding to each of the two magnets, which detect the magnetic fields, and
   wherein a posture is detected by combining detection results of the two detection sensors.

(7) The information processing apparatus according to any one of (1) to (5),
   wherein the posture detection section includes
      three magnets, provided in at least one of the first housing and the second housing, which generate magnetic fields; and
      three detection sensors, provided corresponding to each of the three magnets, which detect the magnetic fields, and
   wherein a posture is detected by combining detection results of the three detection sensors.

(8) The information processing apparatus according to any one of (1) to (7),
   wherein the display control section controls a display orientation as the display state of the display section.

(9) The information processing apparatus according to (8),
   wherein in a case where an automatic rotation of the display orientation is set when in the fourth posture, the display control section allows the display orientation to be rotated in accordance with an inclination of the display section, and
   wherein the information processing apparatus further includes a storage section which stores the display orientation when in the fourth posture.

(10) The information processing apparatus according to (9),
   wherein in a case where an automatic rotation of the display orientation is not set, the display control section fixes the display orientation of the display section.

(11) An information processing method, including:
   detecting any of the four postures of
      a first posture in which a second housing is closed with respect to a first housing so that a display section, provided in the second housing rotatably connected with respect to the first housing and reversed between a first position and a second position, is positioned in the first position and faces a main surface of the first housing, a second posture in which the second housing is opened with respect to the first housing in a state in which the display section is positioned in the first position, a third posture in which the second housing is opened with respect to the first housing in a state in which the display section is positioned in the second position, and a fourth posture in which the second housing is closed with respect to the first housing so that a portion of an opposite side to the display section positioned in the second position faces the main surface of the first housing; and controlling a display state of the display section by a processor in accordance with a detection result of the posture.

What is claimed is:

1. An information processing apparatus, comprising:
   a first housing;
   a second housing, having a display section which displays information, in which the display section is reversed between a first position and a second position;
   a support plate positioned on a rear surface side of the second housing to support the second housing, the support plate including a first support section and a second support section;
   a connection bending section positioned between the first support section and the second support section to rotatably connect the second support section with respect to the first support section;
   a connection section directly coupled to each of the first housing and the first support section so as to rotatably connect the first support section to the first housing;
   a posture detection section which detects any of four postures of
      a first posture in which the second housing is closed with respect to the first housing so that the display section positioned in the first position faces a main surface of the first housing,
      a second posture in which the second housing is opened with respect to the first housing in a state in which the display section is positioned in the first position,
      a third posture in which the second housing is opened with respect to the first housing in a state in which the display section is positioned in the second position, and
      a fourth posture in which the second housing is closed with respect to the first housing so that a portion of an opposite side of the display section positioned in the second position faces the main surface of the first housing; and
   a display control section which controls a display state of the display section in accordance with a detection result of the posture detection section,
   wherein in the first posture when the display section faces the main surface of the first housing, the second housing constitutes a flat plate and is positioned immediately adjacent the first housing,
   wherein the second support section includes a first end and a second end, the first end being connected to the connection section and the second end secured to a rear surface of the second housing so as to fixedly support the second housing on the rear surface side of the second housing, and
   wherein in the fourth posture, an entirety of the second support section from the first end to the second end that faces the first support section, is in contact with the first support section.

2. The information processing apparatus according to claim 1, further comprising:
   an input section provided in at least one of the first housing and the second housing; and
   an input control section which controls an input function of the input section in accordance with a detection result of the posture detection section.

3. The information processing apparatus according to claim 1, further comprising:
   a control apparatus which controls the information processing apparatus,
   wherein the control apparatus limits the control of the information processing apparatus in the case where the posture detection section detects the fourth posture more than the control of the information processing apparatus in the case where the posture detection section detects the first posture, the second posture or the third posture.

4. The information processing apparatus according to claim 1,
   wherein the posture detection section further detects a fifth posture in which the second housing is in a state of rotating between the third posture and the fourth posture.

5. The information processing apparatus according to claim 4,
   wherein the posture detection section has a delay time before determining a posture from when a transition shift from the fifth posture to the third posture is detected.

6. The information processing apparatus according to claim 1,
   wherein the posture detection section includes
      two magnets, provided in at least one of the first housing and the second housing, which generate magnetic fields; and
      two detection sensors, provided corresponding to each of the two magnets, which detect the magnetic fields, and
   wherein a posture is detected by combining detection results of the two detection sensors.

7. The information processing apparatus according to claim 1,
   wherein the posture detection section includes
      three magnets, provided in at least one of the first housing and the second housing, which generate magnetic fields; and
      three detection sensors, provided corresponding to each of the three magnets, which detect the magnetic fields, and
   wherein a posture is detected by combining detection results of the three detection sensors.

8. The information processing apparatus according to claim 1,
   wherein the display control section controls a display orientation as the display state of the display section.

9. The information processing apparatus according to claim 8,
   wherein in a case where an automatic rotation of the display orientation is set when in the fourth posture, the display control section allows the display orientation to be rotated in accordance with an inclination of the display section, and wherein the information processing apparatus further comprises a storage section which stores the display orientation when in the fourth posture.

10. The information processing apparatus according to claim 9,
wherein in a case where an automatic rotation of the display orientation is not set, the display control section fixes the display orientation of the display section.

11. The information processing apparatus according to claim 1, wherein the first support section and the second support section are approximately the same size.

12. The information processing apparatus according to claim 11, wherein the first support section and the second support section together cover an entirety of the rear surface side of the second housing.

13. An information processing method, comprising:
detecting any of four postures of
a first posture in which a second housing is closed with respect to a first housing, a support plate positioned on a rear surface side of the second housing to support the second housing, the support plate including a first support section and a second support section, a connection bending section positioned between the first support section and the second support section to rotatably connect the second support section with respect to the first support section, the first housing and the second housing being directly coupled to a connection section for rotatably connecting the first and second housings, wherein a display section provided in the second housing is configured to be reversed between a first position and a second position, in the first posture, the display section being positioned in the first position so as to face a main surface of the first housing,
a second posture in which the second housing is opened with respect to the first housing in a state in which the display section is positioned in the first position,
a third posture in which the second housing is opened with respect to the first housing in a state in which the display section is positioned in the second position, and
a fourth posture in which the second housing is closed with respect to the first housing so that a portion of an opposite side to the display section positioned in the second position faces the main surface of the first housing; and
controlling a display state of the display section by a processor in accordance with a detection result of the posture,
wherein in the first posture when the display section faces the main surface of the first housing, the second housing constitutes a flat plate and is positioned immediately adjacent the first housing,
wherein the first support section is connected to the connection section, and the second support section includes a first end and a second end, the first end being connected to the connection section and the second end secured to a rear surface of the second housing so as to fixedly support the second housing on the rear surface side of the second housing, and
wherein in the fourth posture, an entirety of the second support section from the first end to the second end that faces the first support section is in contact with the first support section.

\* \* \* \* \*